United States Patent
van Meurs et al.

(10) Patent No.: US 10,574,318 B2
(45) Date of Patent: Feb. 25, 2020

(54) APPARATUS AND METHODS FOR SYNCHRONIZATION OF TRANSMITTERS

(71) Applicant: NXP B.V., Eindhoven (NL)

(72) Inventors: Lars van Meurs, Eindhoven (NL); Alessio Filippi, Eindhoven (NL); Arie Koppelaar, Giessen (NL); Marinus van Splunter, Helmond (NL)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 16/400,324

(22) Filed: May 1, 2019

(65) Prior Publication Data
US 2019/0356366 A1  Nov. 21, 2019

(30) Foreign Application Priority Data
May 15, 2018  (EP) .................................... 18172499

(51) Int. Cl.
*H04L 7/00* (2006.01)
*H04B 7/06* (2006.01)

(52) U.S. Cl.
CPC .................................. *H04B 7/0613* (2013.01)

(58) Field of Classification Search
CPC .... H04B 7/0613; H04B 7/12; H04B 7/18534; H04B 7/026; G06F 13/40; G01S 5/0221; H04W 56/002
(Continued)

(56) References Cited

U.S. PATENT DOCUMENTS 3,829,777 A * 8/1974 Muratani ........... H04B 7/18534
                                                              455/8
9,031,180 B2  5/2015 Rahul et al.
(Continued)

FOREIGN PATENT DOCUMENTS

WO  2006084361 A1  8/2006

OTHER PUBLICATIONS

Borah, D., "Distributed Alamouti Transmit Diversity Technique for Co-Operative Communications", IEEE 2007.
(Continued)

*Primary Examiner* — Phuong Phu

(57) ABSTRACT

A first-transceiver system for use in an antenna diversity scheme. The first-transceiver system comprising: a first-receiver; a first-time/clock-generation-unit; a first-transmitter; and a timing-controller. The first-receiver is configured to receive a wireless first-common-signal from a third-party-transmitter, wherein the first-common-signal is representative of a common-signal transmitted by the third-party-transmitter. The timing-controller is configured to: receive signaling representative of the first-common-signal; receive signaling representative of a wireless second-common-signal as received at a second-transceiver, the wireless second-common-signal being representative of the common-signal; and generate a timing-signal based on the first-common-signal and the second-common-signal. The first-transceiver system is configured to set the first-time/clock-generation-unit, based on the timing-signal, to reduce an alignment-error between the first-time/clock-generation-unit and the second-time/clock-generation-unit. The first-transmitter is configured to transmit a wireless first-transmission-signal, in accordance with the first-time/clock-generation-unit, as part of the antenna diversity scheme that comprises aligned transmission of both the first-transmission-signal and a second-transmission-signal.

20 Claims, 13 Drawing Sheets

(58) Field of Classification Search
 USPC .......................... 375/356, 347, 299, 267, 354
 See application file for complete search history.

(56) References Cited

U.S. PATENT DOCUMENTS

| | | | |
|---|---|---|---|
| 9,160,519 B1* | 10/2015 | Leong | H04W 56/002 |
| 9,306,639 B2 | 4/2016 | Burchard et al. | |
| 9,392,563 B2 | 7/2016 | Guo et al. | |
| 2009/0029663 A1* | 1/2009 | Saban | H04B 7/12 |
| | | | 455/208 |
| 2011/0050501 A1* | 3/2011 | Aljadeff | G01S 5/0221 |
| | | | 342/387 |
| 2014/0211779 A1 | 7/2014 | Rogalin et al. | |
| 2016/0036499 A1* | 2/2016 | Burchard | H04B 7/026 |
| | | | 375/267 |
| 2016/0191138 A1* | 6/2016 | Kianush | G06F 13/40 |
| | | | 375/327 |

OTHER PUBLICATIONS

EP Application No. 18172503.7, filed on May 15, 2018, and entitled "Apparatus and Methods for Synchronization of Transmitters".

* cited by examiner

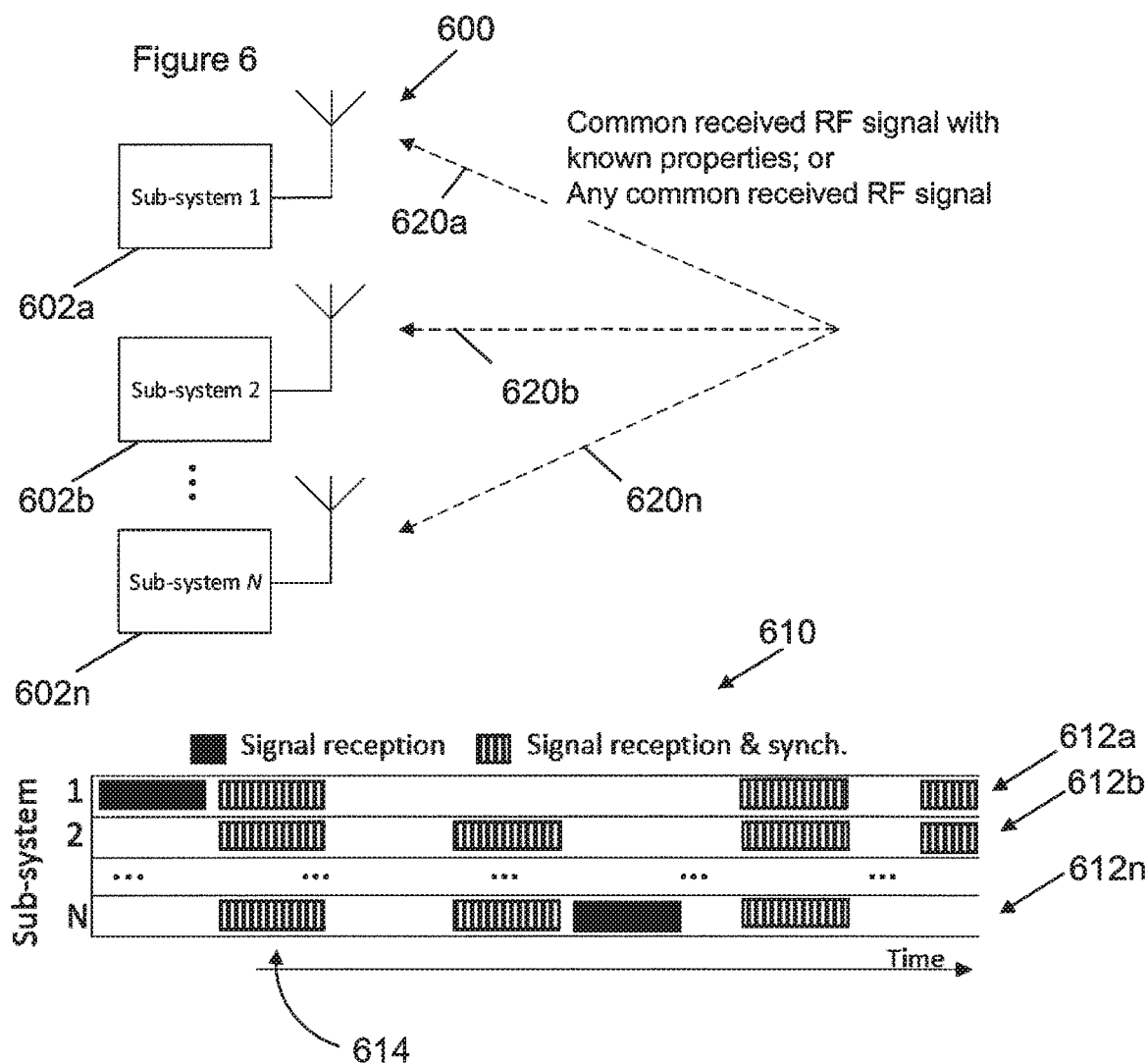

APPARATUS AND METHODS FOR SYNCHRONIZATION OF TRANSMITTERS

CROSS-REFERENCE TO RELATED APPLICATIONS

This application claims the priority under 35 U.S.C. § 119 of European Patent application no. 18172499.8, filed on 15 May 2018, the contents of which are incorporated by reference herein.

The present disclosure relates to apparatus and methods for the alignment of transmissions, in particular, although not necessarily, transmissions provided by a distributed transceiver system designed for antenna diversity usage.

According to a first aspect of the present disclosure there is provided a first-transceiver system for use in an antenna diversity scheme, the first-transceiver system comprising:
  a first-time/clock-generation-unit;
  a first-receiver, configured to receive a wireless first-common-signal from a third-party-transmitter, wherein the first-common-signal is representative of a common-signal transmitted by the third-party-transmitter;
  a first-transmitter; and
  a timing-controller, configured to:
    receive signaling representative of the first-common-signal;
    receive signaling representative of a wireless second-common-signal as received at a second-transceiver, the second-transceiver comprising a second-time/clock-generation-unit, the wireless second-common-signal being representative of the common-signal;
    generate a timing-signal based on the first-common-signal and the second-common-signal,
  wherein:
    the first-transceiver system is configured to set the first-time/clock-generation-unit, based on the timing-signal, to reduce an alignment-error between the first-time/clock-generation-unit and the second-time/clock-generation-unit;
    the first-transmitter is configured to transmit a wireless first-transmission-signal, in accordance with the first-time/clock-generation-unit, as part of the antenna diversity scheme, wherein:
      the first-transmission-signal corresponds to a second-transmission-signal that is transmitted by the second-transceiver; and
      the antenna diversity scheme comprises aligned transmission of both the first-transmission-signal and the second-transmission-signal.

Advantageously, such a first-transceiver can provide an alignment solution for an antenna diversity scheme that does not necessarily require an extra wired interface, any feedback from the receiving party, or the availability of a GPS signal or a base station.

In one or more embodiments, the first-transceiver is configured to set the first-time/clock-generation-unit by adjusting a time of the first-time/clock-generation-unit and/or a frequency of the first-time/clock-generation-unit.

In one or more embodiments, the first-time/clock-generation-unit comprises a frequency synthesizer and a system timer. The first-transceiver may be configured to set the first-time/clock-generation-unit by one or more of:
  applying an offset to a count of the system timer;
  applying a frequency offset to one or more of:
    a carrier frequency that is provided to tuners of the transmitter and/or the receiver,
    a sampling frequency that is provided to a DAC of the transmitter and/or an ADC of the receiver,
    a system timer frequency that is provided to the system timer;
  tuning a crystal oscillator that is associated with the frequency synthesizer;
  changing divider settings of a phase locked loop that is associated with the frequency synthesizer;
  digitally rotating digital samples for compensating an RF carrier frequency offset; and
  resampling of a digital signal for compensating a difference in DA (or AD) converter frequency.

In one or more embodiments, the common-signal comprises a predetermined pattern of information. The timing-controller may be configured to generate the timing-signal based on a correlation technique.

The correlation technique may include one or more of:
  (i) a cross-correlation: which includes a correlation between the received first-common signal and a known predetermined pattern; and
  (ii) an auto-correlation of one or more known repeating patterns in the received first-common signal.

In one or more embodiments, the timing-controller is configured to generate the timing-signal based on a comparison of first-IQ-samples representative of the first-common-signal and second-IQ-samples representative of the second-common-signal.

In one or more embodiments, the aligned transmission comprises transmission of both the first-transmission-signal and the second-transmission-signal aligned with respect to time and/or frequency such that they constructively combine when received at a remote receiver.

There is also disclosed a multi-transceiver system comprising:
  any first-transceiver system disclosed herein,
  a second-transceiver, and
  a digital communication channel configured to exchange coordination-signaling to between the first-transceiver and the second-transceiver to co-ordinate setting the first-time/clock-generation-unit and/or the second time/clock-generation-unit.

In one or more embodiments, the timing-controller is:
  co-located with the first-transceiver; and
  connected to the second-transceiver via the digital communication channel.

In one or more embodiments, the multi-transceiver system further comprises a central control unit that is separate from the first-transceiver. The central control unit:
  may be configured to provide the functionality of the timing-controller; and/or
  may be connected to the first-transceiver and the second-transceiver via the digital communication channel.

In one or more embodiments, the timing-controller is configured to set the first-time/clock-generation-unit and the second-time/clock-generation-unit based on an average time and/or frequency derived from the first-common-signal and the second-common-signal.

In one or more embodiments, the first-receiver is configured to receive a wireless second-alignment-signal from the second-transceiver. The wireless second-alignment-signal may be representative of a state of the second-time/clock-generation-unit. The first-transceiver may be configured to set the first-time/clock-generation-unit, based on the wireless second-alignment-signal, to reduce an alignment-error between the first-time/clock-generation-unit and the second-time/clock-generation-unit.

In one or more embodiments, the wireless second-alignment-signal comprises a prefix and/or a postfix portion of an earlier-second-transmission-signal. The earlier-second-transmission-signal may be transmitted before the second-transmission-signal.

In one or more embodiments, the first-transceiver or multi-transceiver system is further configured to:
- receive a plurality of wireless alignment-signals, including the wireless second-alignment-signal, from a plurality of other transceivers, including the second-transceiver; and
- set the first-time/clock-generation-unit, based on the plurality of wireless alignment-signals, to reduce alignment-errors between the first-time/clock-generation-unit and a plurality of time/clock-generation-units of the other transceivers.

In one or more embodiments, the coordination-signaling comprises one or more of:
- a time-of-transmission of the second-alignment-signal;
- a value of the second-time/clock-generation-unit at a predefined moment in time relative to the time-of-transmission of the second-alignment-signal;
- a value of the second-time/clock-generation-unit at a time-of-transmission of the second-alignment-signal;
- a delay between the time-of-transmission and the time-of-reception of the second-alignment-signal;
- an expected time of arrival of the wireless second-alignment-signal at the first-transceiver; and/or
- an expected time of arrival of the wireless first-alignment-signal at the second-transceiver.

According to a further aspect, there is provided a method of operating a first-transceiver system for use in an antenna diversity scheme, the first-transceiver system comprising a first-time/clock-generation-unit, the method comprising:
- receiving at the first-transceiver system a wireless first-common-signal from a third-party-transmitter, wherein the first-common-signal is representative of a common-signal transmitted by the third-party-transmitter;
- receiving signaling representative of a wireless second-common-signal as received at a second-transceiver, the second-transceiver comprising a second-time/clock-generation-unit, the wireless second-common-signal being representative of the common-signal;
- generating a timing-signal based on the first-common-signal and the second-common-signal,
- setting the first-time/clock-generation-unit, based on the timing-signal, to reduce an alignment-error between the first-time/clock-generation-unit and the second-time/clock-generation-unit;
- transmitting a wireless first-transmission-signal, in accordance with the first-time/clock-generation-unit, as part of the antenna diversity scheme, wherein:
  - the first-transmission-signal corresponds to a second-transmission-signal that is transmitted by the second-transceiver; and
  - the antenna diversity scheme comprises aligned transmission of both the first-transmission-signal and the second-transmission-signal.

In one or more embodiments, the first-transmitter is configured to transmit a wireless first-alignment-signal, representative of a state of the first-time/clock-generation-unit, for reducing an alignment-error between the second-time/clock-generation-unit and the first-time/clock-generation-unit.

In one or more embodiments, the first-transceiver my further comprise a controller configured to determine an alignment-error associated with the first-transceiver. If the alignment error is greater than a predetermined threshold, then the first-transceiver may be configured to set the first-time/clock-generation-unit based on the wireless second-alignment-signal.

In one or more embodiments, the first-transmission-signal corresponds to the second-transmission-signal as both the first-transmission-signal and the second-transmission-signal comprise corresponding representations of an information-signal.

In one or more embodiments, the wireless second-alignment-signal is a wireless Radio Frequency signal.

In one or more embodiments, the digital communication channel is connected between:
(i) a timing-controller; and
(ii) the first-transceiver and the second-transceiver,
wherein the timing-controller is configured to provide the coordination-signaling to the first-transceiver and/or the second-transceiver to coordinate setting the first-time/clock-generation-unit and/or the second-time/clock-generation-unit.

In one or more embodiments, the first-transceiver is spaced apart from the second-transceiver.

According to a further aspect, there is provided a method of operating a first-transceiver for use in an antenna diversity scheme, the method comprising:
- receiving a wireless second-alignment-signal from a second-transceiver with a second-time/clock-generation-unit, wherein the wireless second-alignment-signal is representative of a state of the second-time/clock-generation-unit; and
- setting the first-time/clock-generation-unit, based on the wireless second-alignment-signal, to reduce an alignment-error between the first-time/clock-generation-unit and the second-time/clock-generation-unit;
- transmitting a wireless first-transmission-signal, in accordance with the first-time/clock-generation-unit, as part of the antenna diversity scheme. wherein:
  - the first-transmission-signal corresponds to a second-transmission-signal that is transmitted by the second-transceiver; and
  - the antenna diversity scheme comprises aligned transmission of both the first-transmission-signal and the second-transmission-signal.

This method may be provided in combination with any other method disclosed herein.

There is also disclosed an electronic device or an integrated circuit comprising any first-transceiver or multi-transceiver system disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which:

FIG. 6 shows an example embodiment of a multi-transceiver system and a timeline of transmissions for a system that uses wirelessly received common-signals to provide synchronization;

Figure 1:
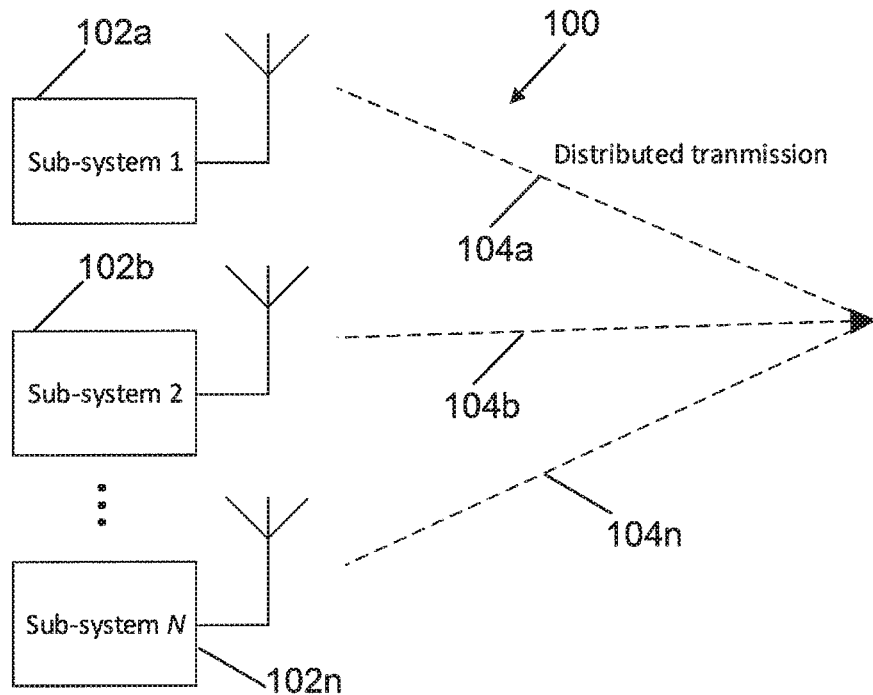
FIG. 1 shows an example of a distributed transceiver system.

In wireless communication systems, multiple well-separated antennas can be used for radio transmission at the same time on the same frequencies to increase the performance of these systems. These transmissions could be employed with multi antenna processing techniques and/or antenna diversity schemes such as: transmit diversity schemes; Cyclic delay diversity; Alamouti techniques; Multiple-Input Multiple-Output (MIMO) techniques; and beamforming techniques, to further enhance the performance. Receivers rely in general on the possibility that the RF signals transmitted over multiple antennas are well aligned in time and/or frequency in order to be able to receive and properly decode the transmitted signals.

In some transmitter architectures, multiple transmitters can be co-located (e.g. on the same chip, Printed Circuit Board (PCB) or module) and share the same time/frequency reference or clock. However, expensive cables are then needed to transport the RF signals from each transmitter to the antennas. To benefit from transmit diversity schemes, antennas should be well-separated, which makes these cables lengthy and therefore even more expensive.

In a distributed transmitter architecture, the RF signal for each antenna can be generated by a separate transmitter that is preferably located close to its associated antenna. By generating the RF signal close to the antenna no, less, or shorter expensive cables are needed to transport the RF signal from each transmitter to each antenna.

In a distributed architecture, each transmitter can have its own independent time/frequency reference (e.g. a signal from an oscillator or clock). Since the antenna/transmitter combinations can be well-separated, sharing/locking the oscillators of the transmitters would require an extra costly interface and/or expensive cables. A potential problem is that cost-effective oscillators may deviate too much from each-other and cause a lack of adequate alignment between transmitted signals. This can cause receivers, that do not anticipate this, to have problems with receiving the signals transmitted by these multiple transmitters. Receivers could have problems due to the resulting carrier frequency offset (CFO), sampling frequency offset (SFO) between the transmitters, and transmission time offset (offsets between the multiple transmitters) caused by oscillator offsets, which in turn cause the receivers to experience undesirably higher error rates. Further details are provided below.

It may not be straightforward to ensure adequate synchronization/alignment among distributed transceivers, which is advantageous in order to realize time and/or frequency aligned transmissions, such as for transmit diversity schemes.

This disclosure provides new ways to synchronize the time and/or frequency of a plurality of distributed Radio Frequency (RF) transceivers with independent time and/or frequency references (such as independent oscillators), by processing a suitable commonly received signal. As will be discussed below, optionally, a determination of what signals are commonly received can be made by sharing characteristics of the signal between the transceivers. In this way, a plurality of transmitters can be capable of transmitting overlapping (in both time and frequency) signals that can effectively add up in the air to form together a desired signal for a receiver, that can be received without significant alignment problems. This can be part of a transmit diversity scheme and/or an antenna diversity scheme, for example.

FIG. 1 shows a system 100 having a plurality of transceivers 102a-n. The system 100 includes a first-transceiver 102a, a second-transceiver 102b and an Nth-transceiver 102n. In this example, the first-transceiver 102a, the second-transceiver 102b and the Nth-transceiver 102n are physically spaced apart with respect to one another, which can help to overcome problems arising from interference, such as fading, as described below.

Each of the distributed transceivers 102a-n includes at least one RF transmitter and at least one RF receiver. The transmitters and receivers can share or be locked to the same time and/or frequency reference (for example, one derived from a local oscillator). They are also able to share information with each-other, such as coordination signaling as will be described below. Such information can be shared via a digital interface or wirelessly. These transceivers may also be referred to as sub-systems of a distributed system.

The first-transceiver 102a can transmit a first-transmission-signal 104a, and the second-transceiver 102b can transmit a second-transmission-signal 104b. While the system 100 has N transceivers 102a-n arranged to transmit N transmission-signals 104a-n, other similar systems can have only two transceivers or any other larger number of transceivers.

The first-transmission-signal 104a can correspond to the second-transmission-signal 104b. For example, the first-transmission signal 104a may be representative of an information signal, while the second-transmission signal 104b is also representative of the same information signal. Both the first-transmission signal 104a and the second-transmission-signal 104b may thereby contain the same information content, corresponding to the information signal such that they constructively combine when received at a remote receiver.

In this way the system 100 of FIG. 1 can provide aligned transmission of the first-transmission-signal 104a and the second-transmission-signal 104b, for example as part of a transmit diversity scheme. Here, aligned transmission means that the time of transmission and/or the frequency of transmission of the first-transmission-signal 104a and the second-transmission-signal 104b are co-ordinated. In some examples, such coordination can mean that the first-transmission-signal 104a and the second-transmission-signal 104b are transmitted at the same time and the same frequency (to within a tolerance determined by an acceptable magnitude of alignment error). Providing aligned transmission of the first-transmission-signal 104a and the second-transmission-signal 104b from two separate transmitters can advantageously improve the performance of a receiver that receives the first-transmission-signal 104a and the second-transmission-signal 104b, especially in conditions where one or both signals are subject to interference such as fading. This may arise, in particular, where the fading causes significant attenuation of one of the transmission signals, while the other signal is not as badly affected, because the first-transceiver 102a and the second-transceiver 102b are physically spaced apart, such that their respective signals do not propagate via the same signal paths to the receiver. This can advantageously provide for a reduced rate of errors at the receiver.

In other examples, the first-transmission-signal 104a and the second-transmission-signal 104b may be transmitted at slightly different times, as part of a beamforming or phased-array system for instance. In such cases, transmission at different times is an example of aligned transmission as differences in the times of transmission can be carefully controlled with respect to one another to achieve a desired effect.

When the transceivers 102a-n are synchronized (with respect to time and/or frequency), each transmitter in a transceiver 102a-n is able to perform a time and/or frequency aligned transmission together with its counterpart transmitters in the other transceivers. The reception performance of receivers (remote), that want to receive the aligned transmissions from transceivers/sub-systems 102a-n and are not designed to cope with misalignment between transmission times/frequencies, should not be affected if synchronization is achieved within an acceptable alignment error margin.

Solutions to the problem of aligning, or synchronizing, multiple transceivers disclosed herein include processing wirelessly received common-signals (that are representative of a common-signal transmitted by the third-party-transmitter), that are received at different transceivers, to reduce an alignment-error between respective time/clock-generation-units of the transceivers. Several different architectures can be used to achieve alignment, as disclosed further below.

Figure 2:
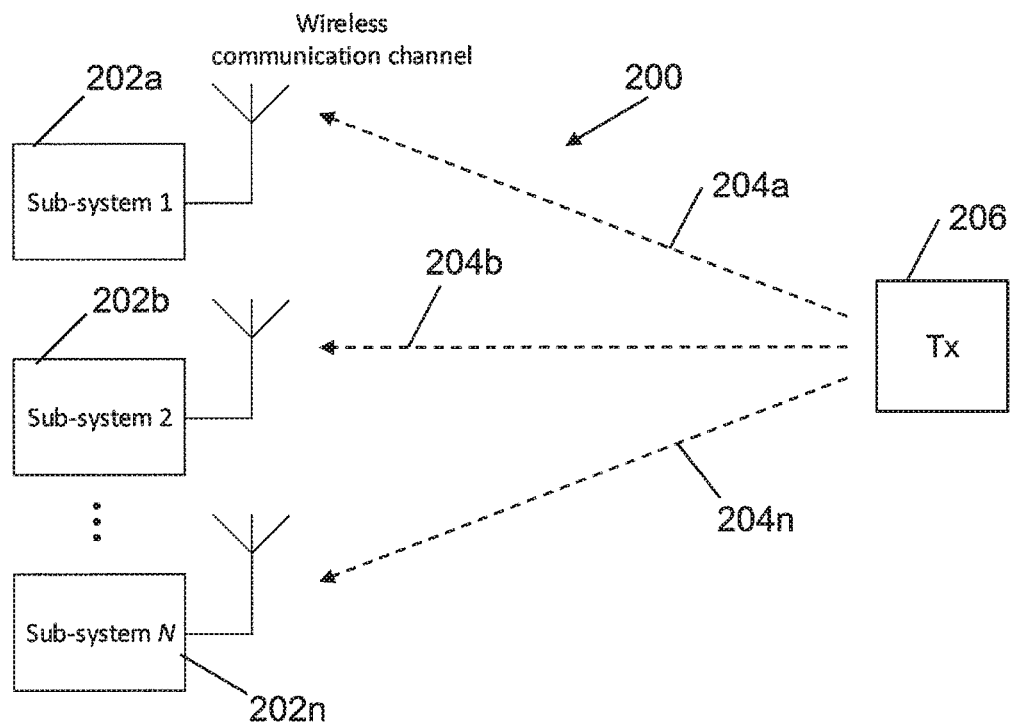
FIG. 2 shows an example embodiment of a multi-transceiver system that wirelessly receives common-signals.

FIG. 2 shows an example architecture 200 for a multi-transceiver system.

In this example architecture 200, each of a plurality of transceivers 202a-n receive an instance of a common-signal 204a-n that is representative of a common-signal transmitted by a third-party-transmitter 206 over a wireless communication channel. Each of the transceivers has a time/clock-generation-unit that provides local timing and/or frequency information for the transceiver. The system also includes the functionality of a timing-controller, which may be provided as part of one of the transceivers 202a-n or separately for example as part of a central controller. As will be described in detail below, the timing-controller processes signaling representative of a plurality of common-signals received at different transceivers, and generates a timing-signal based on those common-signals. One or more of the transceivers can then set a parameter of their time/clock-generation-unit, based on the timing-signal, to reduce an alignment-error between its time/clock-generation-unit and one or more of the time/clock-generation-units of the other transceivers.

In this way, the transceivers may be able to satisfactorily synchronize/align with each other, without requiring feedback from the receiving party and without requiring a wired connection between them.

Figure 3A:
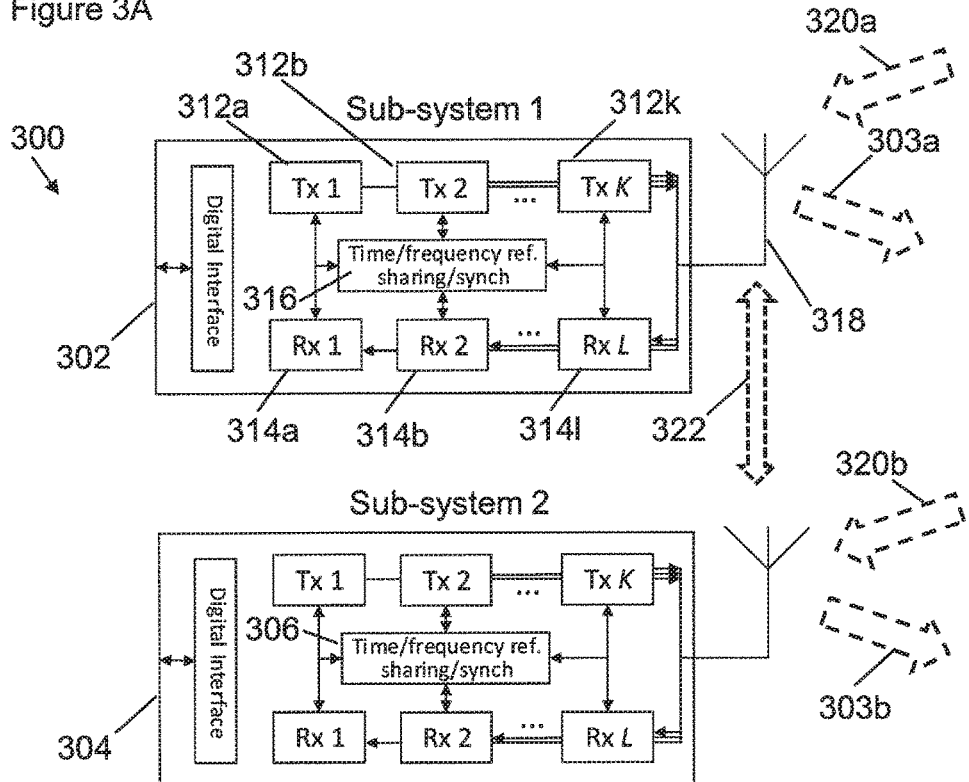
FIG. 3A shows an example embodiment of o transceivers of a multi-transceiver system in further detail.

FIG. 3A shows a multi-transceiver system 300 with a first-transceiver 302 and a second-transceiver 304 that can he used in a transmit diversity scheme. The transceivers may also be referred to as sub-systems. The first-transceiver 302 has K distinct transmitters 312a-k and L distinct receivers 314a-l. Generally, K and L can both be any whole number, either 1 or more. The transmitters 312a-k and receivers 314a-l in this multi-transceiver system 300 may comply with different communications standards and may operate at different frequencies.

The first-transceiver 302 includes a time/clock-generation-unit 316 (time/frequency reference sharing/synch) that provides one or more frequencies and/or time references for the first-transceiver 302. Similarly, the second-transceiver 304 includes a second-time/clock-generation-unit 306.

Figure 3B:
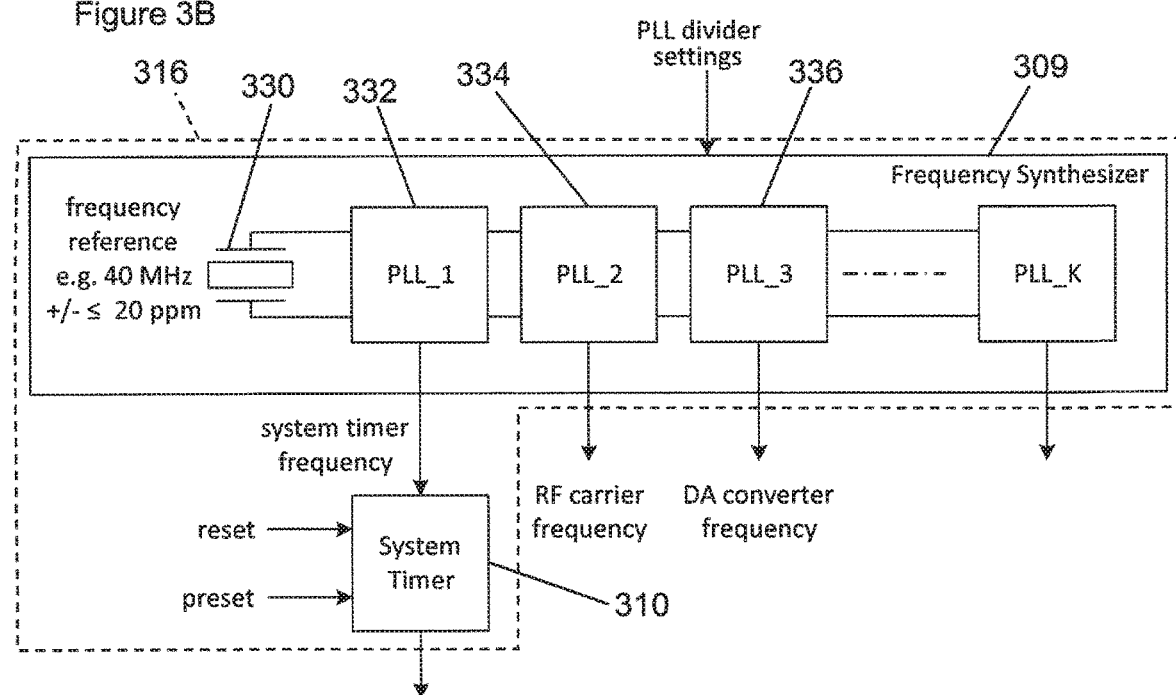
FIG. 3B shows an example implementation of a time/clock generation unit for a transceiver.

FIG. 3B is an example implementation of a time/clock-generation-unit 316 such as the one illustrated in FIG. 3A. The time/clock-generation-unit 316 includes a frequency synthesizer 309 and a system timer 310.

The frequency synthesizer 309 includes a frequency reference, which in this example is a crystal oscillator 330. In some examples, the crystal oscillator 330 is provided with temperature control for stability. The crystal oscillator 330 can provide a reference frequency of 40 MHz and an accuracy of >20 ppm in this example. The IEEE 802.11 standard requires this accuracy. It will be appreciated that using a more accurate oscillator would be more expensive.

The frequency synthesizer 309 derives several frequencies from the reference frequency that is provided by the crystal oscillator 330. For example, phase locked loops (PLLs) can be used to derive one or more of the following frequencies: a frequency for the system timer 310, an RF carrier frequency, a digital-to-analogue (DA) converter frequency, an analogue-to-digital (AD) converter frequency, CPU clock frequency, DSP clock frequency, etc.

Globally one can write the relation between a derived frequency (fi) and the reference frequency fref as fi=Ni*fref/Mi, where Ni and Mi are the divider settings of the corresponding phase locked loop (PLL_i).

For the two or more transceivers, it can be important to have a sufficiently small offset between at least some of the derived frequencies. A possible reason for the presence of an offset is due to an inaccuracy of the crystal oscillator 330.

The system timer 310 can be implemented as a modulo counter running on the system timer frequency, running from 0 up to C-1. For the two or more transceivers, the system timers 310 should: (i) run on the same system timer frequency; and (ii) should have the same phase. In relation to "phase": that is, at a given instant in time the system timers 310 of each of the transceivers should have the same value (or the discrepancy should be sufficient small). If the system knows the discrepancy of the counter values, then it can correct for the discrepancy by presetting the counter to a specific value.

There are several ways to correct/compensate for offsets as will be discussed below.

Returning to FIG. 3A, the first-receiver 314a can receive a wireless first-common-signal 320a from a third-party-transmitter via an antenna 318. The second-transceiver 304 can receive a wireless second-common-signal 320b via an antenna. The wireless first-common-signal 320a and the wireless second-common-signal 320b are both representative of a common-signal transmitted by a third-party-transmitter (not shown). In this example, the first-common-signal 320a and the wireless second-common-signal 320b are wireless Radio Frequency (RF) signals.

The first-transceiver 302 also receives coordination-signaling 322, which in this example is representative of the wireless second-common-signal 320b as received at the second-transceiver 304. Therefore, the first-transceiver 302 can process signaling representative of both the first-common-signal 320a and the second-common-signal 320b in order to generate a timing-signal (not shown). In this way, the first-transceiver 302 provides the functionality of a timing-controller. Examples of timing-signals will be described below.

As will be discussed below, the first-transceiver 302 can use the timing-signal to set the first-time/clock-generation-unit 316 in order to reduce an alignment-error between the first-time/clock-generation-unit 316 and the second-time/clock-generation-unit 306, including frequencies and clocks derived from these units.

The second-transceiver 304 is similar to the first-transceiver 302, so the second-transceiver 304 and its component parts will not be described further here.

It will be appreciated that the designations of components herein as being 'first' or 'second' (as in first-time/clock-generation-unit 316 and second-time/clock-generation-unit 306 above) does not imply any structural or chronological limitation, and simply serves to identify which components are part of which transceiver.

The first-transceiver 302 can set one or more parameters associated with the first-time/clock-generation-unit 316, based on the timing-signal, to reduce an alignment-error between the first-time/clock-generation-unit 316 and the second-time/clock-generation-unit 306. If there is a significant difference between the first-time/clock-generation-unit 316 and the second-time/clock-generation-unit 306 then setting the first-time/clock-generation-unit 316 can mean adjusting a parameter or setting in order to change the time and/or the frequency of the first-time/clock-generation-unit 316. Examples of such adjustments are described above. In this way, the alignment-error, that is, the difference in a time and/or frequency of the first-time/clock-generation-unit 316 and the second-time/clock-generation-unit 306, can be reduced. It will be appreciated that if there is no significant alignment-error then the first-time/clock-generation-unit 316 may not need to be adjusted.

The coordination-signaling 322 can also be used to coordinate setting of the first-time/clock-generation-unit 316 and/or the second-time/clock-generation-unit 306. In some examples, the coordination-signaling 322 can enable the multi-transceiver system 300 to determine which transceiver to operate as a "master", and which transceivers will operate as "slaves" such that they will align their time/clock-generation-units accordingly. In multi-transceiver systems with a large number of transceivers, such coordination-signaling 322 can enable one or more transceivers to act as a 'master' transceiver with a 'master' time/clock-generation-unit while the other transceivers act as 'slaves' that align their time/clock-generation-units to that of the 'master' time/clock-generation-unit(s). The co-ordination-signaling 322 can enable different transceivers to assume the role of 'master' at different times. In this way, the coordination-signaling 322 can coordinate setting the first-time/clock-generation-unit 316 and/or the second-time/clock-generation-unit 306.

The first-transmitter 312a can transmit a wireless first-transmission-signal 303a for a remote receiver via the antenna 318, in accordance with a time and/or frequency of the time/clock-generation-unit 316 once it has been aligned, as part of an antenna diversity scheme. Transmission of the first-transmission-signal can therefore occur at a time determined by a state of the time/clock-generation-unit 316 and/or using a carrier and sampling frequency derived from the time/clock-generation-unit reference (e.g. a crystal oscillator within the time/clock-generation-unit). Similarly, a transmitter of the second-transceiver 304 can transmit a wireless second-transmission-signal 303b for the remote receiver in accordance with a time and/or frequency of the second-time/clock-generation-unit 306, as part of the antenna diversity scheme. In this way, the antenna diversity scheme comprises aligned transmission of both the first-transmission-signal 303a and the second-transmission-signal 303b.

Figure 4A:
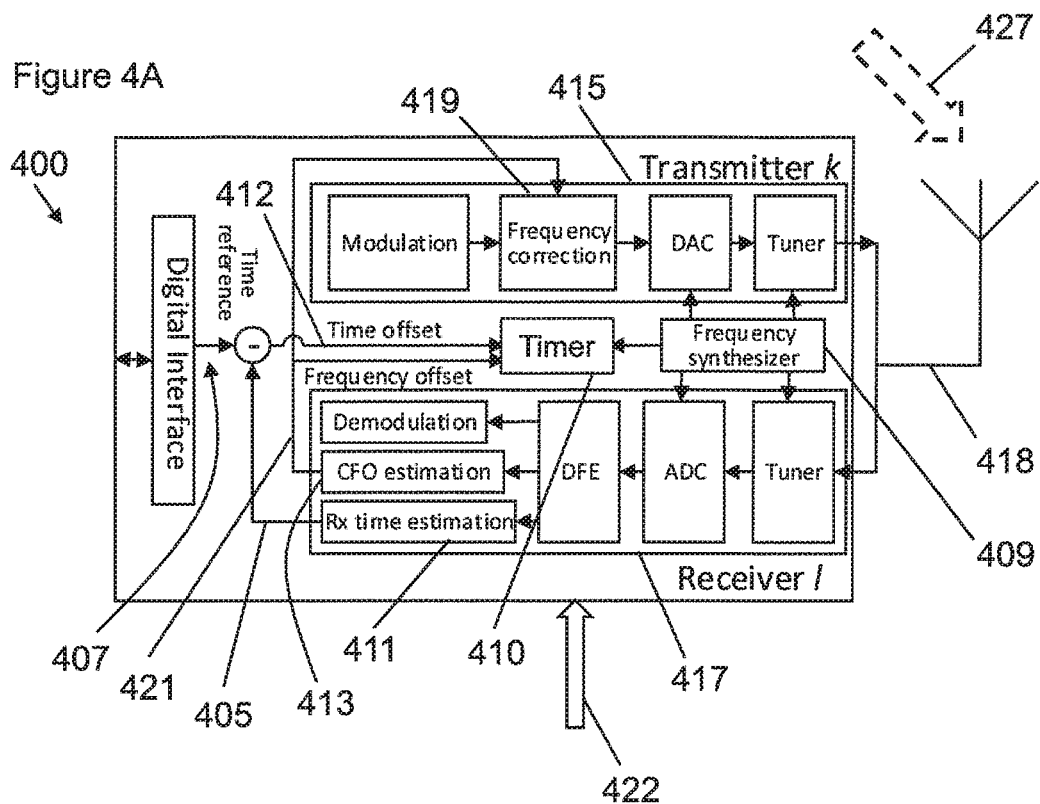
FIG. 4A shows an example embodiment of a transceiver that can reduce alignment errors with respect to other transceivers situated elsewhere in a distributed transceiver system.
Figure 4B:
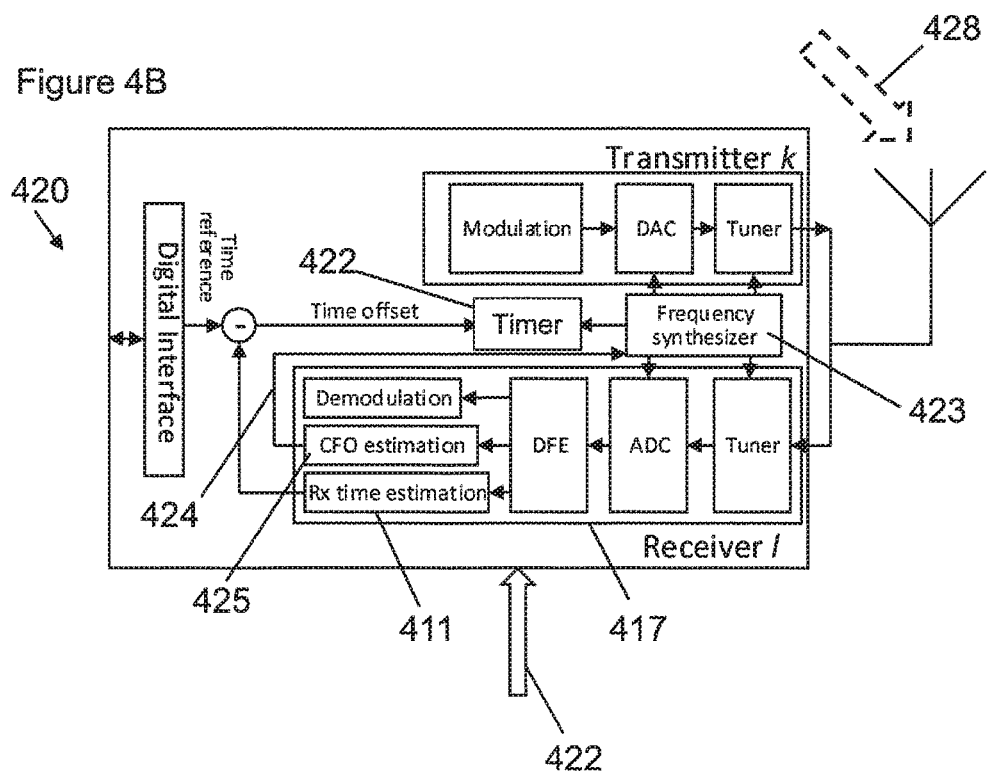
FIG. 4B shows another example embodiment of a transceiver that can reduce alignment errors with respect to other transceivers situated elsewhere in a distributed transceiver system.

FIGS. 4A and 4B show two transceivers 400, 420 that can correct alignment errors with respect to other transceivers situated elsewhere in a distributed transceiver system. That is, these two transceivers 400, 420 are to be synchronized based on a timing-signal (wherein the timing-signal is determined in accordance with a plurality of received wireless common-signals, as described above). The two transceivers 400, 420 represent two solutions (which could also be used in combination) that make use of the fact that RF signals conceal a time/frequency reference from its transmitter. In these examples, the transceivers 400, 420 shown provide the functionality of a timing-controller.

FIG. 4A shows a transceiver embodiment 'A' 400. The transceiver A 400 includes a receiver 417, a transmitter 415, an antenna 418, a system timer 410 and a frequency synthesizer 409. The system timer 410 and the frequency synthesizer 409 can be considered to be part of a time/clock-generation-unit, as described above. The receiver 417 includes a Rx time estimation block 411 and a CFO estimation block 413, which are configured to process a signal received at the antenna 418. The transmitter 415 includes a frequency correction block 419, which as discussed below can be for carrier frequency offset (CFO) and/or sampling frequency offset (SFO) correction.

The frequency synthesizer 409 processes a clock-source-signal that is provided by an oscillator (such as a crystal oscillator as described above) and generates signals with different frequencies. These signals include: (i) a signal with a carrier frequency that is provided to the tuners of the transmitter 415 and the receiver 417; (ii) a signal with a sampling frequency (or digital signal processing frequency) that is provided to the DAC of the transmitter 415 and the ADC of the receiver 417; and (iii) a signal with a system timer frequency that is provided to the system timer 410.

The SFO is an offset between the sampling frequency of each distributed transmitter, which is equivalent to a difference in sample period. When the sample period is not the same, transmitted samples from each transmitter can get increasingly misaligned over time during a frame transmission, which can have negative effects on the receiver.

The CFO is a carrier frequency offset between two transmitters that provide the aligned transmission-signals as part of an antenna diversity scheme. Since the remote receiver experiences the combined signal of multiple transmission-signals it may not be able to correct for the separate carrier frequency offsets from the multiple transceivers. If the carrier frequency offset between the multiple transmission-signals is sufficiently small, the remote receiver will not suffer from it.

In some examples, the frequency synthesizer 409 can derive the carrier frequency, sample frequency and the system timer frequency from one reference frequency. In which case, these frequencies have a known relation to each other. Therefore the transceiver 400 can estimate a carrier frequency offset as discussed below, and then determine the offsets of the other frequencies unambiguously. For example, estimating the CFO can be less complex in some applications, and therefore the transceiver can determine the CFO based on an estimated CFO, and then correct for it.

In some applications, the SFO effects can have much less impact than the CFO effects. This is because, in general the sampling frequency is much less than the carrier frequency ($fs<<fc$). In some systems, the impact of SFO could be insignificant and such that it is not necessary to correct for SFO.

In this example, the system timer 410 is a component that counts periods of the input clock signal received from the frequency synthesizer 409 to generate a reference of elapsed time. This elapsed time can be used to time transmissions, amongst other things. In a distributed system, the system timer 410 should be synchronized in order the align the frame transmissions (in time) of the various distributed transmitters.

The transceiver 400 receives a wireless first-common-signal 427 from a third-party-transmitter at its antenna 418. The first-common-signal 427 is representative of a state of the time/clock-generation-unit of the transmitter that sent it. The receiver 417 within the transceiver 400 can therefore determine information about properties of the first-common-signal 427. The transceiver 400 also receives coordination-signaling 422 that includes signaling that is representative of a wireless second-common-signal as received at a second-transceiver (not shown). In this example the signaling 422 is received via wired connection, indirectly from the second-transceiver.

As discussed below the transceiver 400 can estimate an offset between: (i) its system timer 410 (that provides the timing information for transmitting a transmission-signal) and (ii) a time/clock-generation-unit of the transceiver that received the wireless second-common-signal. Additionally, or alternatively, the transceiver 400 can estimate an offset between (iii) its frequency synthesizer 409 (that provides frequency information for transmitting a transmission-signal) and (iv) a time/clock-generation-unit of the transceiver that received the wireless second-common-signal.

For example, correlation techniques can be used to determine these offsets. Example properties of the received common-signal 427 that can be used for this purpose can include a predetermined part or parts of the common-signal 427, or a known repetition of the common-signal 427. These properties could be pre-defined or communicated as part of the coordination-signaling 422 via an available communication channel, which could be either wireless or hard-wired. When these offsets are known, the timing-signal can be used to counteract any SFO/CFO and timer clock skew as will be discussed below.

The transceiver 400 can thus operate as a timing-controller by processing signaling representative of the first-common-signal 420 and signaling representative of the wireless second-common-signal; and generating a timing-signal 412, 421 for reducing an alignment-error between the time/clock-generation-units of the first and second transceiver. As discussed herein, the time/clock-generation-units can include a system timer 410 and a frequency synthesizer 409.

The Rx time estimation block 411 can generate a ToA-signal 405 that is representative of the time of arrival (ToA) of the RF signal 427 (according to the time base of the receiving sub-system).

In some examples, the second-transceiver (that received the second-common-signal) can provide the time-of-arrival (according to the time base of the second-transceiver) to the transceiver 400 via an available communication channel (which can be wireless or wired), for example as part of the coordination-signaling 422. This time-of-arrival can be provided as a count-value of the system timer of the second-transceiver, at the instant in time that the second-common-signal was received at the second-transceiver. For example, the instant in time that a predetermined pattern in the second-common-signal was received at the second-transceiver.

The time of arrival of the second-common-signal is shown in FIG. 4A with reference 407, and is labelled as a "time reference". The time of arrival of the first-common-signal 427 is shown in FIG. 4A with reference 405. The transceiver 400 can then generate an estimated time offset signal 412, representative of the system timer time offset, as the difference between: (i) the time-of-arrival according to the system timer of the second-transceiver that received the second-common-signal, and (ii) the time-of-arrival according to the system timer of the receiver 417. The time offset signal 412 is an example of a timing-signal, which is based on a plurality (in this case two) common-signals that are received at different transceivers.

The estimated time offset signal 412 is provided to the system timer 410 such that it can minimize its time offset to the system timer of the second-transceiver and generate a reference of elapsed time that is used by the transmitter 415 to time transmissions aligned with the second-transceiver.

to The CFO estimation block 413 generates an estimated carrier frequency offset signal 421, which is representative of a carrier frequency offset between the local RF carrier and the RF carrier of the transmitter of the common signal. The estimated frequency offset signal 421 is another example of a timing-signal, which can be used to reduce an alignment-error between a first-time/clock-generation-unit (of the transceiver 400 shown in FIG. 4A) and a second-time/clock-generation-unit (of the second-transceiver).

For example, a first-transceiver can determine its carrier frequency offset relative to the transmitter of the common signal as: CFO1=fcTx−cRx1. Similarly, a second-transceiver can determine its carrier frequency offset relative to the transmitter of the common signal as: CFO2=fcTx−fcRx2. The difference between these carrier frequency offsets (CFO1-2) can be determined as CFO1−CFO2=−(fcRx1−cRx2).

Two examples of correcting for the difference between these carrier frequency offsets (CFO1-2) are described here. 1) Each transceiver individually modifies its carrier frequency fc to reduce its carrier frequency offset relative to the transmitter of the common signal. In this way, CFO1 and CFO2 each becomes smaller and consequently CFO1-2 also reduces. 2) One or more of the transceivers communicates its CFO to a timing-controller, which can, based on the received offset from each transceiver, determine the frequency or offset each transceiver should adapt to. For example, the first-transceiver communicates its CFO1 to the second-transceiver; the second-transceiver then calculates CFO1−CFO2 and therefore also determines fcRx1−fcRx2; the second-transceiver can than adapt its carrier frequency such that the carrier frequency offset between transceiver 1 and 2 (CFO1-2) is reduced.

It will be appreciated that, in many applications, the distributed transceiver will communicate at a frequency that is different to the RF carrier frequency (fcTx) of the common signal. The RF carrier frequency of the common signal can be used as a reference for the individual transceivers to determine their mutual frequency offsets. From the determined carrier frequency offset, the transceivers (or a timing controller) can determine what the frequency difference is between the reference frequencies of the transceivers, and also what frequency offset exists at the RF carrier frequency at which they will transmit distributed diversity signals.

Further details of examples for reducing the difference between carrier frequency offsets of the transceivers are provided below with reference to FIG. 6.

The estimated frequency offset signal 421 is provided to the system timer 410 such that it applies a clock skew correction to the system timer 410 to reduce the timer frequency offset. That is, if the system timer 410 counts too fast or too slow (i.e. there is a clock skew), due to an input signal with frequency offset, the transceiver 400 can correct this by causing the system timer 410 to count faster/slower based on the estimated frequency offset signal 421. The estimated carrier frequency offset signal 421 relates to the timer frequency offset in this example because a single oscillator is used to provide a clock-source-signal to the frequency synthesizer 409, and the system timer 410 is used for both the transmitter 415 and the receiver 417.

The CFO estimation block 413 also provides the estimated frequency offset signal 421 to the frequency correction block 419 of the transmitter 415. In this way, the transmitter 415 can correct the carrier frequency and/or sampling frequency of the signals that are to be transmitted, thereby correcting CFO and/or SFO.

The functionality described above and illustrated in FIG. 4A enables the transceiver A 400 to employ a frequency shift in the digital baseband to compensate for carrier frequency offset (CFO) when transmitting a signal. In other embodiments, the frequency shift can be employed at an analogue front-end of the transceiver. Correcting the system timer 410 frequency offset can be beneficial, because a lower frequency offset will result in a transmission time offset that increases less over time.

FIG. 4B shows a transceiver embodiment 'B' 420. The transceiver B 420 includes a receiver 417, a transmitter and a local system-timer. The receiver 417 includes a Rx time estimation block 411 and a CFO estimation block 425.

The Rx time estimation block 411 generates a ToA-signal that is used in the same way as for FIG. 4A.

The CFO estimation block 425 generates an estimated frequency offset signal 424 in the same way as for FIG. 4A. The estimated frequency offset signal 424 in this example is provided to the frequency synthesizer 423, such that the frequency synthesizer 423 applies a frequency offset to both the system timer 422 and the transmitter. In this way the transceiver 420 can correct CFO and/or SFO as well as any timer frequency offset in the system timer 422, by reducing the offset at the source (i.e. oscillator or frequency synthesizer 423) instead of countering the consequences as described with reference to FIG. 4A.

In this way, transceiver B 420 can indirectly tune the system timer 422 to reduce/minimize its timer frequency offset/clock skew using the estimated frequency offset signal 424 provided by the CFO estimation block 425.

The alignment and/or synchronization processing that is described with reference to FIGS. 4A and 4B can advantageously be performed regularly (assuming that suitable common-signals are received by the transceivers) to ensure that transceivers remain in alignment with one another. This can advantageously reduce residual offsets and can counteract changing time and/or frequency references (for example due to drifting oscillators).

It will be appreciated that FIGS. 4A and 4B are only examples, and that a transceiver can compensate for estimated time and/or frequency offsets in different ways. Ways to correct/compensate for time/frequency offsets can include one or more of:

applying an offset to a count of the system timer;

applying a frequency offset to one or more of a carrier frequency that is provided to tuners of the transmitter and/or the receiver, a sampling frequency that is provided to a DAC of the transmitter and/or an ADC of the receiver, a system timer frequency that is provided to the system timer;

tuning a crystal oscillator;

changing the divider settings of a PLL. For example, for a RF carrier frequency PLL this can be possible because the corresponding divider settings Ni, Mi can be many bit numbers;

digitally rotating digital samples (e.g. with a Coordinate Rotation Digital Computer (CORDIC)) for compensating an RF carrier frequency offset; and resampling of a digital signal for compensating a difference in DA (or AD) converter frequency.

Figure 5A:
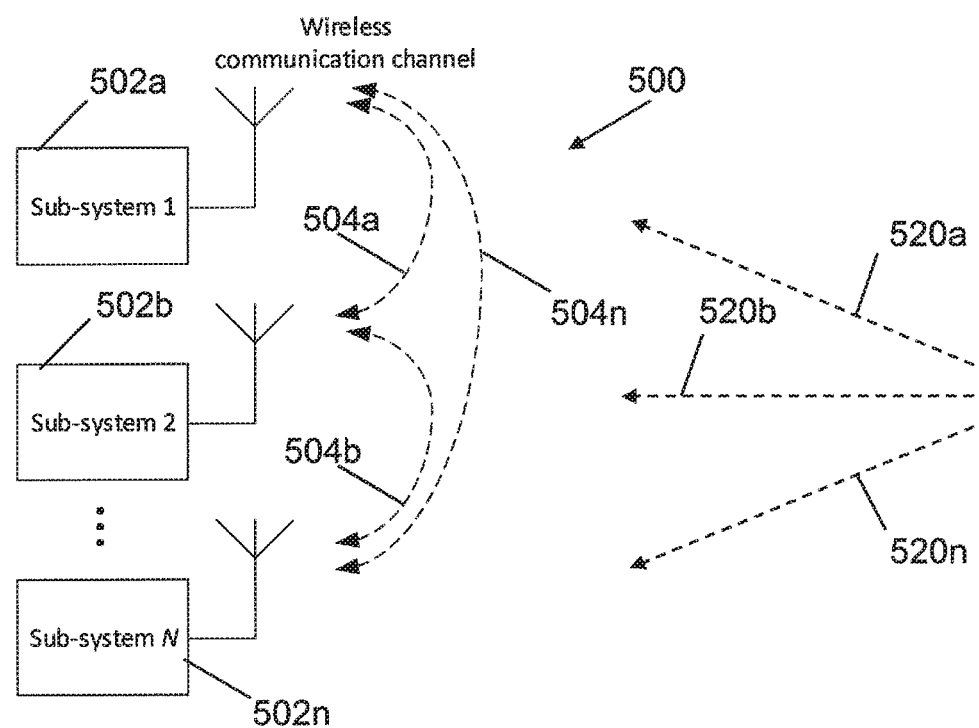
FIG. 5A shows an example architecture for a multi-transceiver system

FIG. 5A shows an example architecture 500 for a multi-transceiver system. A plurality of transceivers 502a-n each receive a respective common-signal 520a-n as discussed above.

In this example architecture 500, coordination-signaling 504a-n is shared between one or more of the plurality of transceivers 502a-n over a wireless communication channel by using one or more available RF receivers and transmitters within each transceiver 502a-n. This transmission of signaling wirelessly can occur with very low transmit power or even be below the noise floor in some examples.

As described herein, the coordination signaling 504a-n can be used to co-ordinate setting one or more of the time/clock-generation-units in the transceivers 502*a-n* in order to improve the alignment/synchronization of the transceivers 502*a-n*. For instance, by determining which transceiver will be a 'master' and which will be a 'slave' at any given alignment/synchronization operation. For the example described above with reference to FIGS. 4A and 4B, the coordination signaling 512*a-n* can include information representative of the phase (i.e. count) of a system timer and/or frequency synthesizer of the transmitting sub-system at the time of arrival of a common-signal; that is, the time-of-arrival according to the time base of the sub-system that received the common-signal.

Figure 5B:
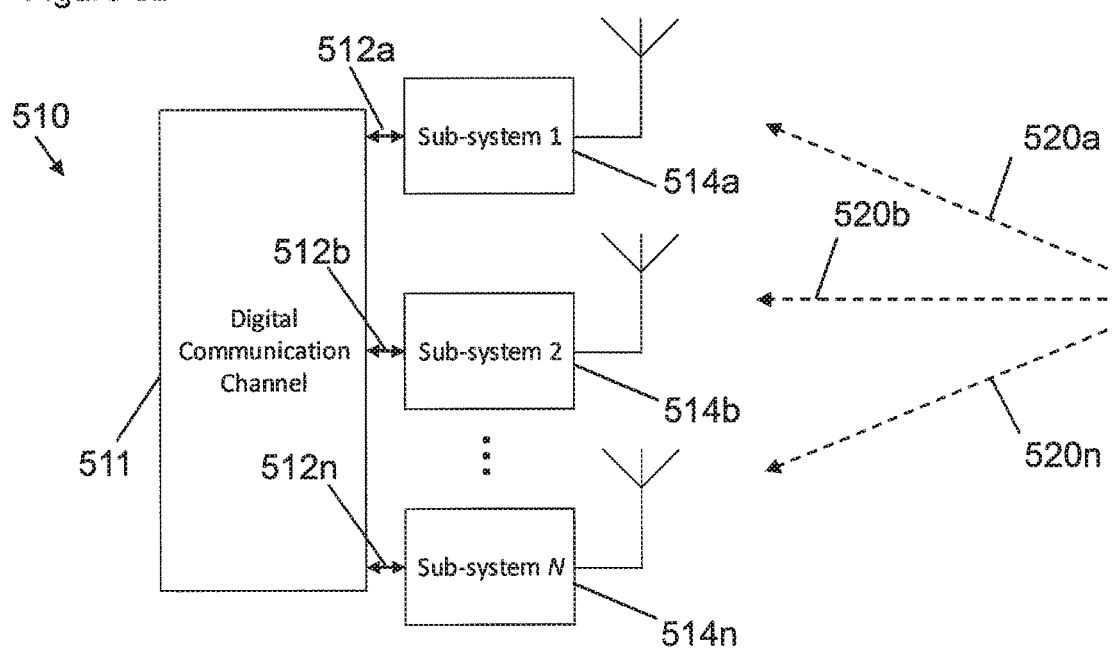
FIG. 5B shows an example embodiment of a multi-transceiver system with a digital communication channel that connects to each transceiver in the system.

FIG. 5B shows an architecture 510 for a multi-transceiver system, which provides an alternative to the architecture described above in relation to FIG. 5A. However, in the architecture 510 of FIG. 5B, the transceivers 502*a-n* exchange coordination-signaling 512*a-n* by way of non-wireless signaling using a digital communications channel 511.

Figure 5C:
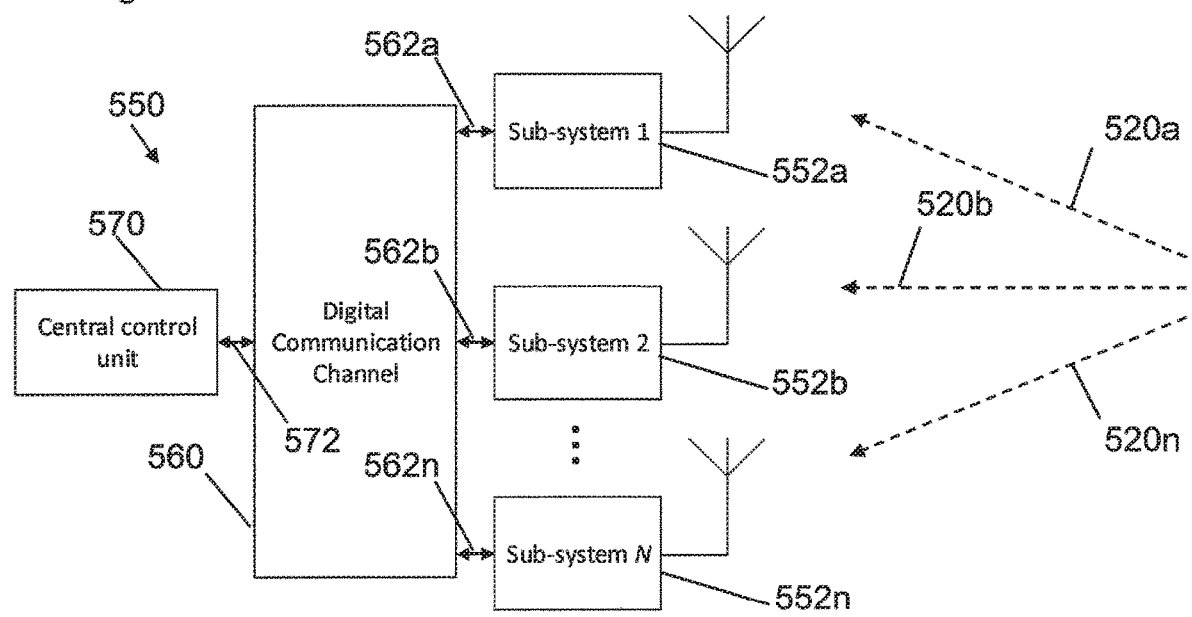
FIG. 5C shows an example embodiment of a multi-transceiver system similar to that shown in FIG. 5B that further includes a central controller connected to the digital communication channel.

FIG. 5C shows a further architecture 550 for a multi-transceiver system, which provides an alternative to the architecture described above in relation to FIGS. 5A and 5B. However, in this architecture 550, coordination-signaling 562*a-n* is exchanged between the transceivers 552*a-n* and a digital communications channel 560 by way of non-wireless signaling. In addition, this architecture 550 has a central control unit 570. The digital communications channel 560 is connected between the central control unit 570 and the transceivers 552*a-n*. The central control unit 570 is designed to coordinate the synchronization of the transceivers 552*a-n*. The central control unit 570 is an example implementation of a timing-controller that can provide a timing-signal 572 to the transceivers 552*a-n* via the digital communications channel 560.

In accordance with the architectures discussed above in relation to FIGS. 5A-5C, a first-transceiver may be able to correct a system timer phase (i.e. count) by comparing: (i) a time-of-arrival of a wireless common-signal (according to a time base of a first-transceiver); with (ii) a time-of-arrival of a wireless common-signal (according to a time base of a second-transceiver). A timing-controller (which may be co-located with a transceiver or provided separately, for example as part of a central control unit) can receive coordination-signaling that includes the time-of-arrival of one or more wireless common-signals (according to a time base of the receiving-transceiver), and then determine the difference between at least two times-of-arrival of the common-signal at different transceivers. This difference can be representative of the difference between the states of the system timers of the receiving transceivers. One or other or both of the system timers of the transceivers can then be set (either directly or indirectly), if necessary, to reduce that difference and thereby improve the alignment between the respective system timers. In this way, the transceivers can transmit signals that are better aligned with each other, for example as part of an antenna diversity scheme.

One or more of the architectures of FIGS. 5A, 5B and 5C can also be used in combination with each other.

The present disclosure proposes new ways to synchronize time and frequency of multiple distributed RF transceivers with independent time and/or frequency references (e.g. oscillators) to enable time and/or frequency aligned multiple antenna transmissions such that they constructively combine when received at a remote receiver. Two different approaches for synchronization or alignment of distributed transceiver-systems are disclosed below. The two approaches can be used individually or in combination.

In the first solution, transceivers are configured to recognise when a predetermined type of "common-signal" has been received, and then process those common-signals to generate a timing-signal. For example, a predetermined type of common-signal may be one that has: predetermined content, is compliant with a predetermined standard, and/or has predetermined properties. In some examples, the knowledge of these properties can be used to determine a time/frequency offset associated with one or more of the transceivers such they can be synchronized with each other.

In the second solution, transceivers do not have to be aware of any signal properties of the received common-signals. For example, baseband IQ-samples of signals received at different transceivers can be determined and used for alignment/synchronization. Such received signals can therefore be used as a common-signal. The IQ-samples are digital data, that can be communicated via any digital communication channel to the other transceiver (likely as payload of a signal/frame). The other transceiver can receive this data and correlate it with the IQ-samples it generated itself from its directly received common-signal. This correlation can result in a time/frequency offset between the first and second transceiver, which can be used to synchronize those transceivers by offsetting either or both of them. In some examples, this can be coordinated by a timing controller.

FIG. 6 shows a distributed transceiver-system 600 with a first transceiver 602*a*, a second transceiver 602*b* and an Nth transceiver 602*n*. FIG. 6 also shows a timeline 610 of receptions 612*a-n* at respective transceivers 602*a-n* of the transceiver-system 600.

FIG. 6 will now be used to further describe the first solution. One or more of the receivers of each transceiver 602 can process incoming signals received at their respective antennas. When a transceiver 602 recognises a predetermined property of a received signal, it can process that received signal as a common-signal 620. This can involve communicating characteristics of the received common-signal 620 to a timing-controller, which can be part of one of the other transceivers 602 or a central control unit (as shown in FIG. 5C). In this way, the timing-controller can receive characteristics from a plurality of the transceivers 602. The timing-controller can then determine, from these characteristics, which common-signaling (with known properties) is commonly received and is suitable to be used for synchronization. In some examples, the timing-controller can determine whether or not to use the received signals as common-signals. In some examples, the transceivers 602 can negotiate among each other as to whether or not to use received signals as common-signals.

As discussed above, the timing-controller (which can either be provided as part of a transceiver 602 or separately) can determine a timing-signal based on a first-common-signal 620*a* and a second-common-signal 620*b* received at different transceivers 602. For instance, the timing-controller can estimate a time/frequency offset for one or more of the transceivers 602. In this solution each transceiver can perform correlation techniques on the locally received common signal to estimate the time of arrival and CFO between itself and the third-party remote transmitter. The times of arrival and CFOs can then be shared with the timing-controller, which can then determine the time/frequency offset between the transceivers. Then the timing-controller can provide a timing-signal to one or both transceivers to counter offset all their frequencies (shown in FIG. 3B) based on the estimated CFO so that they can reduce/minimize their frequency offsets with respect to the remote third-party transmitter. Since both transceivers received the same signal, from the same third-party transmitter, they will then generate approximately the same frequencies.

In this way only the offsets may be shared by the transceivers, and it may not be necessary to share any IQ samples or equivalent.

In some examples, common signals are received from a first remote third-party transmitter A, and at a different moment in time from a second remote third-party transmitter B. Transmitters A and B could have relatively big differences in their frequencies. In such an example, it may not be beneficial to synchronize to the remote third-party transmitter as described above, because this could result in a big variation of the frequencies over time (when the remote third-party transmitter of the common-signals changes over time). To overcome this issue, the second transceiver could communicate its estimated offset (to the remote transmitter) to the first transceiver. The first transceiver can then determine the CFO between itself and second transceiver by subtracting its own CFO estimation and that of the second transceiver. The first transceiver can then counter this offset by adjusting its frequencies with this CFO. Or the first and second transceiver can adjust their frequencies with half of the CFO towards each other, so that their resulting frequencies are approximately the average of the frequencies of both transceivers before synchronization.

Another option is for the transceivers to demodulate/decode symbols that are received as part of the common-signal, and then re-encode/modulate the received symbols to recreate them according to that transceiver's time/clock-generation-unit. The recreated symbols are correlated with the received symbols (both of the same transceiver) to estimate the offsets between the transceiver itself and the remote third-party transmitter. The transceiver can then share these offsets with the timing-controller. Since the received common-signals are representative of the same common-signal transmitted by a third-party-transmitter, the experienced offsets of the individual transceivers to this common-signal is a measure for the mutual offsets between the transceivers.

In some examples, each transceiver 602a-n can share their estimated offsets with the other transceivers or a central controller. Then the offset of each transceiver to all others can be determined. Transceivers can then either synchronize all to one master transceiver, or to an average time and/or frequency derived from the plurality of common-signals.

The timeline 610 shows an example of a timeslot during which common-signals are received by the transceivers, and the transceivers are synchronized based on those common-signals, with reference 614. Other synchronization timeslots are also shown in the timeline 610 of FIG. 6.

FIG. 6 will now be used to further describe the second solution; that is where the transceivers 602a-n are not aware of any signal properties of the received common-signals.

One or more of the receivers of each transceiver 602 can process incoming signals received at their respective antennas. When a transceiver 602 receives a RF signal, it communicates characteristics of the signal to a timing-controller that can be part of one or more of the other transceiver 602 or to a central control unit. These characteristics can include arrival time, power and/or duration as non-limiting examples. The timing-controller can then determine, from these shared characteristics, which RF signal is commonly received and is suitable to be used for synchronization. In some examples, the transceivers 602 can negotiate among each other as to whether or not to use received signals as common-signals.

In some example, it may not be necessary to share characteristics of the received signals; instead, the transceivers 602 can share details of received samples of the received signal (such as in-phase and quadrature samples), and the timing-controller can determine/identify suitable common-signals based on those received IQ-samples. For instance, one of the transceivers 602 can share baseband IQ-samples of the received common-signal with the other transceivers as coordination-signaling via any available communication channel. The transceiver that is controlled so as to share the baseband IQ-samples can be determined by a central controller, or by negotiation between the transceivers via an available communication channel, or can be pre-defined. The selected transceiver can also be changed for different synchronization operations. In some examples, a plurality of transceivers can share their IQ-samples to provide increased robustness.

The other transceivers (that is, the ones that do not share their IQ samples) can correlate the shared IQ-samples with their own received IQ-samples. From this correlation, an arrival time offset and carrier frequency offset between those baseband signals can be estimated. Since the received common-signals are representative of the same common-signal transmitted by a third-party-transmitter, the estimated offsets are a measure of the time/frequency offsets between each transceiver 602 and the transceiver 602 that shared the samples. These transceivers can then correct for these offset as described above.

In some applications it can be beneficial for the transceivers 602 to share their received IQ-samples with a central controller, such that the central controller can perform the correlations. This can be advantageous when there are resource constraints at the transceivers. It also a possibility for the timing-controller to store a set of received IQ-samples, and then use them later to correlate with received IQ-samples (that have the same characteristics) of each transceiver.

An advantage of the solutions described herein is that hardware can be reused. Furthermore, these solutions do not necessarily require an extra wired interface, any feedback from the receiving party of aligned transmissions, or the availability of a GPS signal or a base station. These solutions also have further advantages in that they may not affect normal operation, i.e. they may not require the transmission of additional signals to provide for alignment. Also, they may not limit the transmission of some signals.

In examples where the transceivers do not receive suitable common-signals (for example because they do not receive common-signals with sufficient quantity and/or quality), additional processing can be performed to wirelessly share alignment-signaling between the transceivers. The transceivers can then reduce an alignment-error between time/clock-generation-units based on the wirelessly shared alignment-signaling as discussed below.

Figure 7:
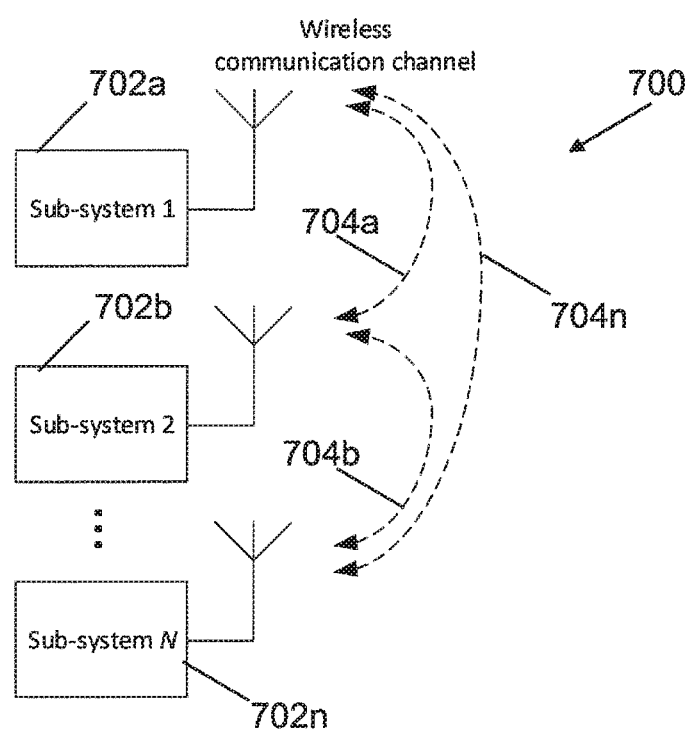
FIG. 7 shows an example architecture for a multi-transceiver system that wirelessly shares alignment-signaling between the transceivers

FIG. 7 shows an example architecture 700 for a multi-transceiver system that wirelessly shares alignment-signaling between the transceivers.

In this example architecture 700, alignment-signaling 704a-n is shared between each of a plurality of transceivers 702a-n over a wireless communication channel by using one or more available RF receivers and transmitters within each transceiver 702a-n. This transmission could occur with very low transmit power or even be below the noise floor (i.e. using spread spectrum communication or ultra wideband (UWB) communication) in some examples. The plurality of transceivers 702a-n can also optionally share additional information wirelessly, such as coordination-signaling and other timing information as discussed below.

In this way, the transceivers may be able to satisfactorily synchronize/align with each other, without requiring feedback from the receiving party and without requiring a wired connection between them.

Returning to FIG. 3A, for examples that process wireless alignment signals, the first-receiver 314*a* can receive a wireless second-alignment-signal (not shown) via an antenna 318. In this example, the wireless second-alignment-signal is a wireless Radio Frequency (RF) signal. The wireless second-alignment-signal is transmitted by the second-transceiver 304 such that the wireless second-alignment-signal is representative of a state of the second-time/clock-generation-unit 306. As will be discussed below, the first-transceiver 302 can use the second-alignment-signal to set one or more parameters of the time/clock-generation-unit 316 in order to reduce an alignment-error between the first-time/clock-generation-unit 316 and the second-time/clock-generation-unit 306, including frequencies and clocks derived from these units.

More generally, an Nth-transceiver can transmit a wireless Nth-alignment-signal, representative of a state of an Nth-time/clock-generation-unit in the Nth-transceiver for reducing an alignment error between the Nth-time/clock-generation-unit and an Mth-time/clock-generation-unit in an Mth-transceiver that receives the Nth-alignment-signal (where N and M serve as indexes for any respective transceivers in a transceiver system containing 2 of more transceivers).

In this example, the coordination-signaling 322 can provides for wireless communication between the first-transceiver 302 and the second-transceiver 304. For example, the coordination-signaling 322 can enable the multi-transceiver system 300 to determine which transceiver will transmit an alignment-signal, and which transceiver will then process the alignment-signal and align its time/clock-generation-unit accordingly. In a similar way to that discussed above, in multi-transceiver systems with a large number of transceivers, such coordination-signaling 322 can enable one or more transceivers to act as a 'master' transceiver with a 'master' time/clock-generation-unit while the other transceivers act as 'slaves' that align their time/clock-generation-units to that of the 'master' time/clock-generation-unit(s). The co-ordination-signaling 322 can enable different transceivers to assume the role of 'master' at different times. In this way, the coordination-signaling 322 can coordinate setting the first-time/clock-generation-unit 316 and/or the second-time/clock-generation-unit 306.

Returning now to FIGS. 4A and 4B, these two transceivers 400, 420 can also be synchronized based on a received wireless alignment signal (not shown).

In this example, the transceiver 400 receives wireless (RF) alignment signals at its antenna 418 from another transceiver in the system. The RF alignment signals are representative of a state of the time/clock-generation-unit of the transmitter that sent them. The receiver 417 within the transceiver 400 can therefore determine information about properties of the RF alignment signal. As discussed herein it can estimate an offset between: (i) its system timer 410 (that provides the timing information for transmitting a transmission-signal) and (ii) a time/clock-generation-unit that provided a time and/or frequency reference at the transmitter that sent the RE alignment signal. Additionally, or alternatively, the receiver 417 can estimate an offset between (iii) its frequency synthesizer 409 (that provides frequency information for transmitting a transmission-signal) and (iv) a time/clock-generation-unit that provided a time and/or frequency reference at the transmitter that sent is the RF alignment signal 427. When these offsets are known, any SFO/CFO and timer clock skew can be counteracted in a similar way to that described above.

In some examples, the transmitting transceiver can provide the time-of-transmission (according to the time base of the transmitting sub-system) to the transceiver 400 via an available communication channel (which can be wireless or wired), for example as part of a coordination-signal. This time-of-transmission can be provided as a count-value of the system timer of the transmitting transceiver, at the instant in time that the transmission was made. This count-value can also be referred to as an elapsed time of the transmitting sub-system at time of transmission.

A delay between the time-of-transmission and the time-of-reception of the RF alignment signal can be determined at the transceiver 400 from round-trip time-of-flight measurements or can be predefined by calibration. The transceiver 400 can then determine a time reference signal 407, which is representative of an expected time-of-reception according to the time base of the transmitting sub-system, as the sum of the time-of-transmission (according to the transmitting sub-system) and the delay between transmission and reception. The time reference signal 407 can be provided by a digital interface, as shown in FIG. 4A.

In a similar way to that described above, the estimated time offset signal 412 is provided to the system timer 410 such that it can minimize/reduce its time offset to the system timer of the second transceiver and generates a reference of elapsed time that is used by the transmitter 415 to time transmissions aligned with the second transceiver.

The transceiver 400 can process (i) the expected time-of-reception according to the time base of the transmitting sub-system (provided as time reference signal 407), and (ii) the time-of-reception according to the time base of the transmitting sub-system (provided by the ToA-signal 405). The transceiver 400 can then generate an estimated time offset signal 412, representative of the system timer time offset, as the difference between: (i) the time-of-reception according to the system timer of the transmitter that transmitted the RF signal 427, and (ii) the time-of- reception according to the system timer of the receiver 417.

It will be appreciated that in other examples, the transceiver 400 can achieve the same result by subtracting the delay between transmission and reception from the time-of-reception according to the time base of the receiving-sub-system, and then comparing the time-of transmission according to the time bases of the transmitting- and receiving-sub-systems.

The CFO estimation block 413 in this example generates an estimated carrier frequency offset signal 421, from which a timer frequency offset between the local system timer 410 and the remote system timer (such as a second system timer, not shown) that was used by the transmitter to trigger the sending of the RF alignment signal can be determined. The estimated frequency offset signal 421 is provided to the system timer 410 and the transmitter 415 in the same way as described above.

The following examples propose new ways to synchronize time and frequency of multiple distributed RF transceivers with independent time and/or frequency references (e.g. oscillators) to enable time and/or frequency aligned multiple antenna transmissions such that they constructively combine when received at a remote receiver. Two different approaches for providing wireless alignment-signals for synchronization or alignment of distributed transceiver-systems are disclosed below. The two approaches can be used individually or in combination.

Figure 8:
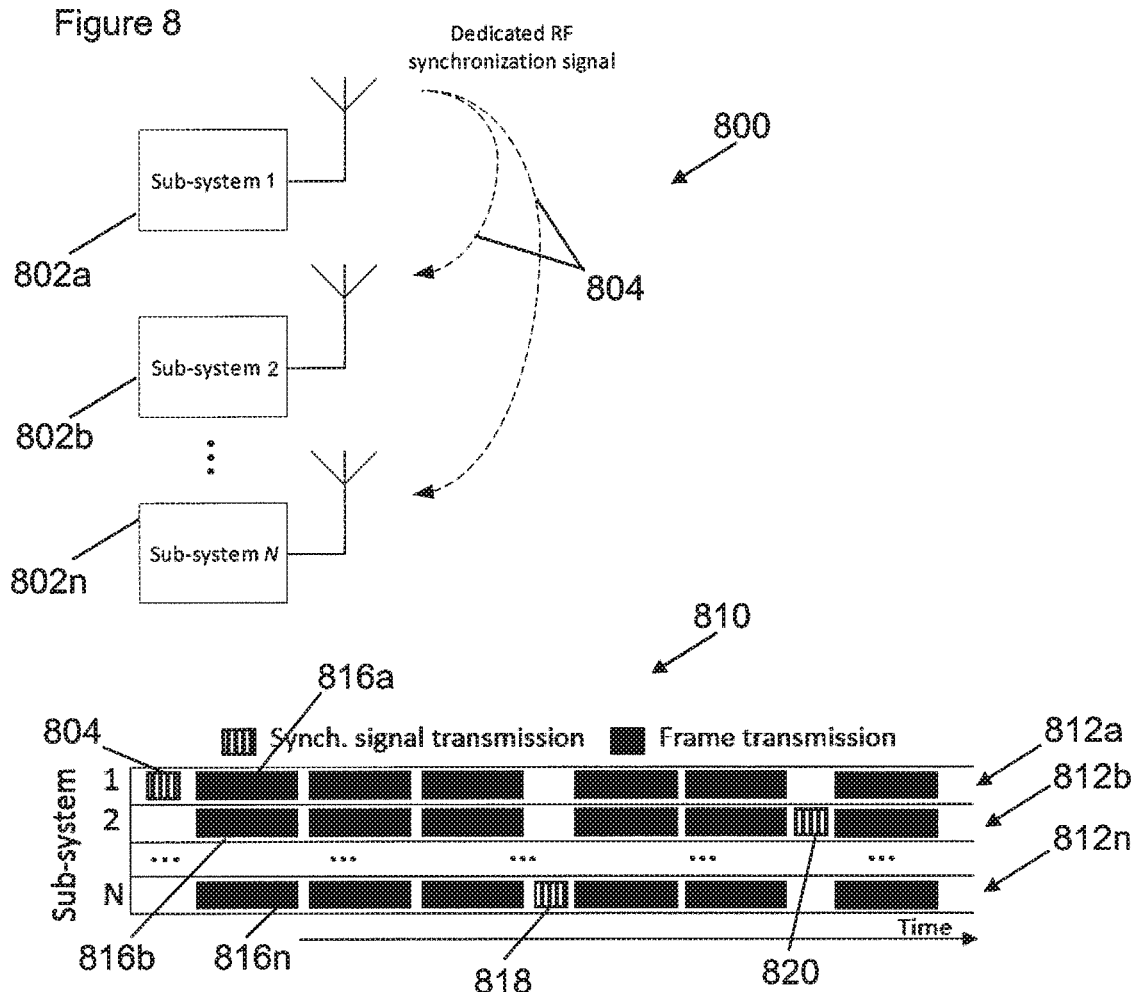
FIG. 8 shows an example embodiment of a multi-transceiver system and a timeline of transmissions where the wireless alignment signal is a dedicated synchronization signal.
Figure 9:
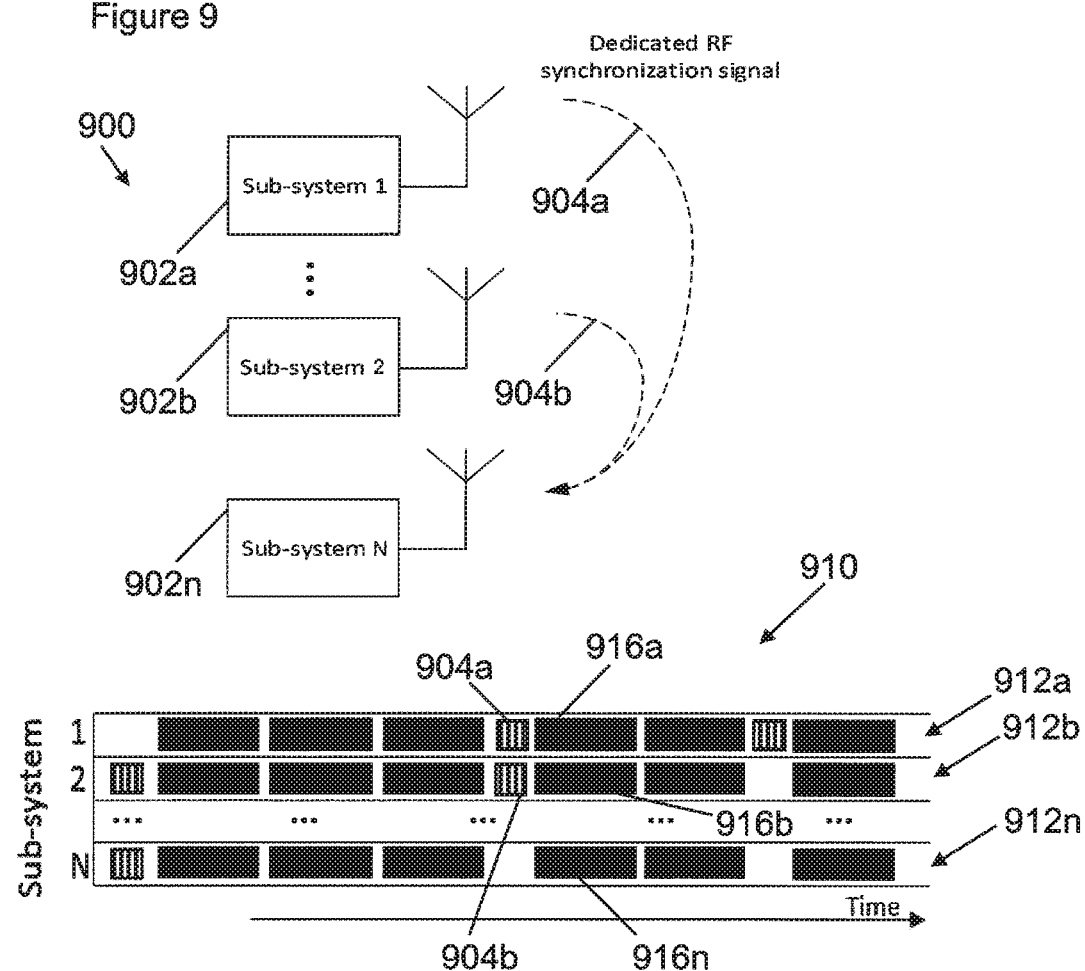
FIG. 9 shows an example embodiment of a multi-transceiver system, similar to that of FIG. 8, and an alternative timeline of transmissions.
Figure 10:
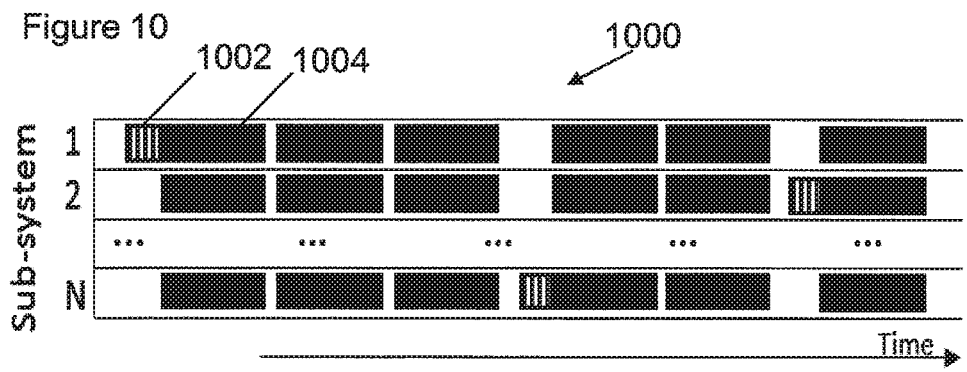
FIG. 10 shows an example embodiment of a timeline of transmissions made by a multi-transceiver system where the alignment signal is a prefix of a frame transmission.

The first approach is disclosed in relation to FIGS. 8 to 10, and generally relates to using dedicated synchronization signals as the wireless alignment-signal. These dedicated synchronization signals can be RF signals that are transmitted by a transmitter in between conventional frame transmissions. Each other transceiver in the distributed system that contains a to-be-synchronized transmitter, receives this signal and can synchronize to it.

Figure 11:
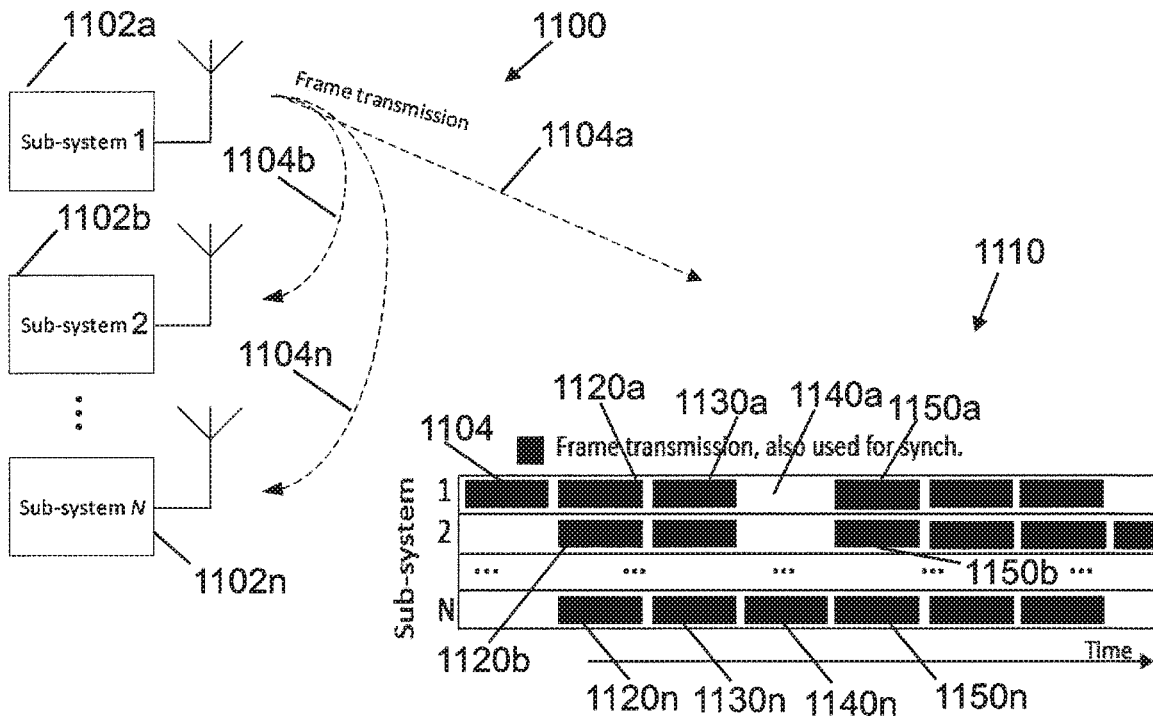
FIG. 11 shows an example embodiment of a multi-transceiver system and a timeline of transmissions where the alignment signal is a frame transmission.
Figure 12:
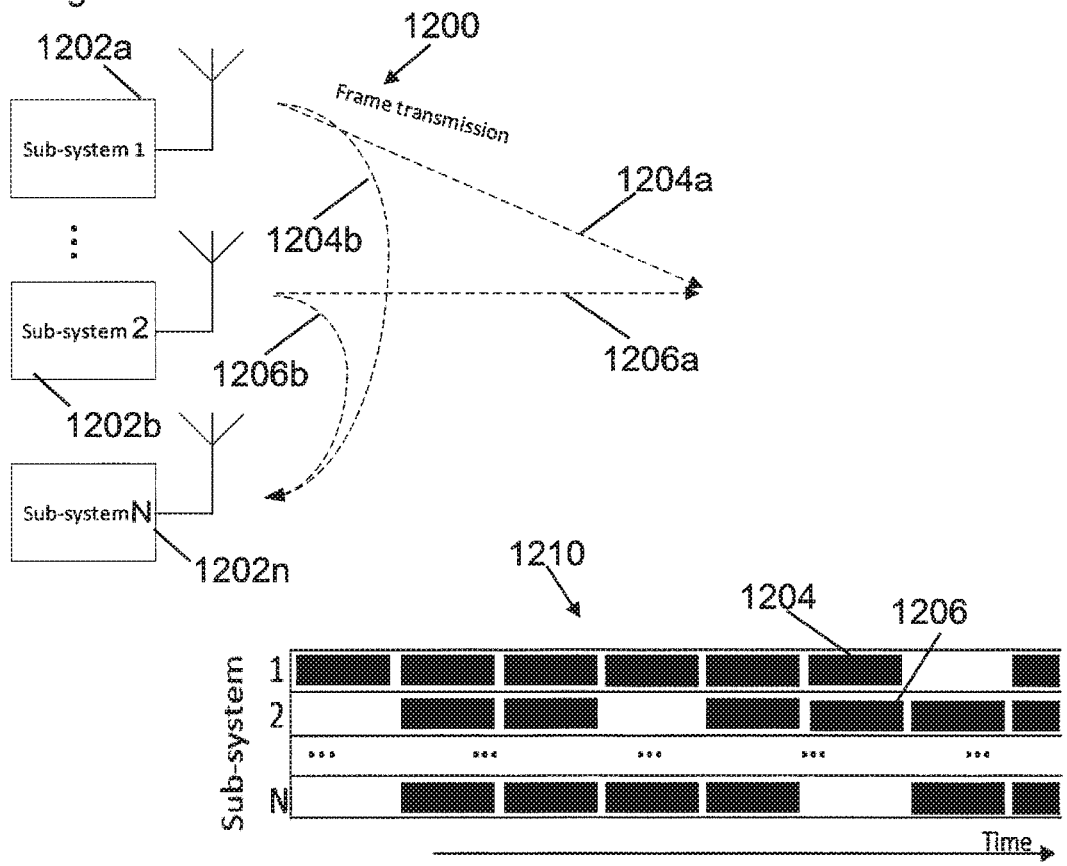
FIG. 12 shows an example embodiment of a multi-transceiver system, similar to that of FIG. 11, and an alternative timeline of transmissions.

The second approach is disclosed in relation to FIGS. 11 and 12. In the second approach, synchronization is done on conventional frame transmissions of the distributed system. Transceivers that do not take part in these transmissions can receive the frame and synchronize to it. In this way, each of those transceivers can synchronize to the average time and/or frequency reference of the transmitting transceivers.

FIG. 8 shows a distributed transceiver-system 800 with a first transceiver 802a, a second transceiver 802b and an Nth transceiver 802n. FIG. 8 also shows a timeline 810 of transmissions 812a-n made by respective transceivers 802a-n of the transceiver-system 800.

A wireless RF first-alignment-signal 804 which in this example is dedicated for alignment/synchronization, is transmitted by the first-transceiver 802a. (In this example the first-transceiver 802a transmits the alignment signal, but it will be appreciated that the transmission can be provided by a different transceiver for any given period of time). The other transceivers 802b-n receive this RF first-alignment-signal 804 and determine the offsets of their time/clock-generation-units with respect to the first-alignment-signal 804 and compensate for it. The properties of the first-alignment-signal 804 that the receiving transceivers 802b-n need for the offset estimation are pre-defined in this example.

When the transceivers 802a-n have been aligned/synchronized, they can each transmit a respective block of data 816a-n to a remote receiver. These blocks of data 816a-n can be called frame transmissions. Since each frame transmission 816a-n, for a given period of time, provided by each transceiver 802a-n is aligned with one another, the quality of the signal received by the remote receiver can be significantly improved with a consequently reduced error rate.

In subsequent time periods, the Nth-transceiver 802n can transmit an Nth-alignment-signal 818 and the second-transceiver 802b can subsequently transmit a second-alignment signal 820.

Depending on the architecture of transceiver-system employed, the transmitter used to transmit the alignment signal for each different period of time can be chosen by a central controller, or by negotiation of the transceivers via an available wireless or hard-wired digital communication channel, or can be pre-defined.

Carrier-Sense Multiple Access with Collision Avoidance (CSMA-CA) like protocols can be used to reduce interference with other systems or to comply with regulations. The wireless transmission of alignment-signals described herein can advantageously be performed with a very low transmit power and can even be below the noise floor (i.e. spread spectrum, ultra wideband (UWB)) to reduce interference. For example, when the transceiver system antennas are located close to each other, relative to the range between the transceiver system and other remote system with which the transceiver system may communicate. By use of a suitable communication channel, coordination signaling can be provided to the other transceivers so they can be made aware of when to expect the alignment/synchronization signals. This can increase the chance for successful reception with reduced error rates.

FIG. 9 shows a distributed transceiver-system 900, similar to that of FIG. 8, with a first transceiver 902a, a second transceiver 902b and an Nth transceiver 902n. FIG. 9 also shows a timeline 910 of transmissions 912a-n made by the transceiver-system 900. In this example, alignment signals 904a-b, which are dedicated synchronization signals, are transmitted simultaneously by a plurality of transceivers. For example, FIG. 9 shows that both the first-transceiver 902a and the second-transceiver 902b can simultaneously transmit alignment signals 904a-b. Non-transmitting subsystems, in this case the Nth-transceiver 902n, can receive the alignment signals 904a-b and align/synchronize based on the plurality of alignment signals, for example based on the sum of the alignment signals 904a-b. When the transceivers 902a-n are aligned, they can each transmit a respective frame transmission 916a-n.

In this way, the transceivers 902a-n can synchronize to an average of the time and/or frequency reference of the plurality of simultaneously transmitted alignment-signals by synchronizing to a RF alignment signal coming from a plurality of different transceivers.

As discussed above, which of the transceivers will perform the alignment-signal transmission and which of the transceivers will set their time/clock-generation-units to improve alignment/synchronization can be pre-defined. Alternatively, coordination-signaling can be exchanged between the transceivers or received from a central controller to define which of the transceivers operate as a master, and which operate as a slave.

FIG. 10 shows a timeline 1000 of alternative alignment transmissions that can be made by the transceivers of FIG. 8. Instead of transmitting the alignment/synchronization signal separately from regular transmissions, the alignment signal can be included as a prefix portion 1002 of a regular frame transmission 1004 or, alternatively as a postfix portion (not shown) of a regular frame transmission.

An alternative to the above approach of using an alignment-signal specifically created for the purpose of aligning the time/clock-generation-units of different transceivers can involve different transceivers using frames transmitted by one or more of the transceivers for alignment purposes. In these examples, the frames contain data to be transmitted to a distant receiver but can also, in addition, be used for alignment purposes.

FIG. 11 shows a multi-transceiver system 1100 with a first transceiver 1102a, a second transceiver 1102b and an Nth transceiver 1102n in which individual transceivers are able to receive the frames being transmitted by one transmitter. FIG. 11 also shows a timeline 1110 of the transmission of frames transmitted by the multi-transceiver system 1100. In this example, only the first transceiver 1102a transmits a first frame 1104a-n. That is, none of the other transceivers 1102b-n transmit a corresponding frame. This may be because the transceivers 1102b-n have determined that they might be out of synch and may only be able to receive the frame from the first transceiver 1102a when they are not transmitting a frame themselves. When they receive that frame from another transceiver they can synchronize again. Optionally, the system may apply an algorithm that predicts, based on drift, when the level of synchronicity of a transceiver has dropped between a certain level. For instance, by determining the last time that synchronisation was carried out. In some examples, a distributed multi-transceiver system can perform single antenna and/or multi antenna transmissions in normal operation.

The single transmission of the first frame 1104a-n, can be received at a remote receiver 1104a, the second transceiver 1102b, and the Nth transceiver 1102n. The second transceiver 1102b and the Nth transceiver 1102n can use the first frame 1104b-n to align their respective time/clock-generation-units with the time/clock-generation-unit in the first transceiver 1102a, for example as discussed above. Then, all of the transceivers 1102a-n of the multi-transceiver system 1100 can transmit a second frame 1120a-n with satisfactory alignment in time and/or frequency.

Subsequently, the transceivers can be re-synchronized/re-aligned based on a frame that is transmitted by a different transceiver—for example a frame 1140n transmitted by the Nth transceiver 1102n.

In some examples, the wireless alignment-signal can be based on an earlier-Nth-transmission-signal 1140n (where N can be any number greater than one). In this example, the alignment/synchronisation of the first-transceiver 1102a can take place during a particular time-slot 1140a. Once the multi-transceiver system 1100 has been aligned, it can transmit a first transmission signal 1150a, a second transmission signal 1150b and an Nth transmission signal 1150n. Since the first transceiver uses the frame 1140n transmitted before the Nth transmission signal 1150n, that frame 1140n can be called the earlier-Nth-transmission-signal.

In some examples, the multi-transceiver system may have a controller configured to determine an alignment-error associated with a transceiver. If the alignment error is greater than a predetermined threshold, then the transceiver can set the first-time/clock-generation-unit based on a wireless alignment-signal.

For instance, the controller may compare signaling representative of a first-transmission-signal 930a and signaling representative of an Nth-transmission-signal 930n to determine an alignment-error. If the alignment error is greater than a predetermined threshold, then the first-transceiver 902a can set the first-time/clock-generation-unit based on the Nth-transmission-signal 940n. In some examples, the controller may simply compare timing/frequency information received as part of a received alignment-signal or transmission signal with information about a local time/clock-generation-unit.

For a particular time-slot during which alignment is performed, the first transceiver 1102a can be de-activated by not transmitting any first-transmission signal. This can improve the first-transceivers 1102a ability to receive the earlier-Nth-transmission-signal 1140n for alignment purposes.

FIG. 12 shows a multi-transceiver system 1200 and a timeline 1210. The multi-transceiver system has a first transceiver 1202a, a second transceiver 1202b and an Nth transceiver 1202n. In this example, the first transceiver 1202a and the second transceiver 1202b are adequately aligned to one another and both transmit respective frames 1204, 1206. The Nth transceiver 1202n lacks adequate synchronization and therefore does not transmit a frame at the same time as the first transceiver 1202a and the second transceiver 1202b. The Nth transceiver 1202n receives the first frame 1204b transmitted by the first transceiver 1202a and the second frame 1206b transmitted by the second transceiver 1202b. The Nth receiver 1202n may not be able to distinguish the two frames, and therefore can receive the sum of both frames. The Nth transceiver can then synchronize to the average of the time/frequency offsets of the transmitted frames 1204b, 1206b. The signal properties of the frames 1204b, 1206b, needed by the receiving Nth transceiver to perform offset estimation can be known because e.g. the frames 1204b, 1206b comply with a standard. (This also holds for frames 1104a and 1140n in FIG. 11.) Alternatively, the properties can be communicated as coordination-signaling via an available digital communication channel from the transmitting transceivers 1202a, 1202b to the receiving transceiver 1202n. For example, the full data to reconstruct the baseband signal (which each transceiver can already have access to in order to participate in a transmit diversity scheme) or even baseband IQ-samples for the frames 1204, 1206 could be shared. The more information of the signal available the more precisely the offsets can be estimated.

To ensure well aligned/synchronised transmissions, a transceiver can be controlled such that it does not join in certain multiple antenna transmissions; for example if a component in the system determines that the transceiver is not sufficiently well synchronized. This determination could be negotiated among transceivers or determined by a central control unit. If a transceiver does not transmit a frame, then it may be configured to receive and process a frame from one or more of the other transceivers and then synchronize/align its time/clock-generation-unit based on the frame(s) from the other transceiver(s).

The embodiments described in relation to FIGS. 11 and 12 have an advantage over the embodiments described in relation to FIGS. 8 to 10, in that no additional transmissions may be needed to perform the alignment/synchronization. However, in the embodiments of FIGS. 11 and 12 this can mean that sometimes a transceiver would not join an intended multiple antenna transmission for a particular frame, to be able to receive the transmission and synchronize instead. That is, the transceivers may not be able to transmit and receive at the same time. In other examples, full-duplex communication may be available. With full-duplex communication, a transceiver can simultaneously join in a multiple transmission (if the alignment error is not too large) and receive transmissions from other transceivers in order to synchronize its time/clock generation unit (reduce alignment error).

Figure 13A:
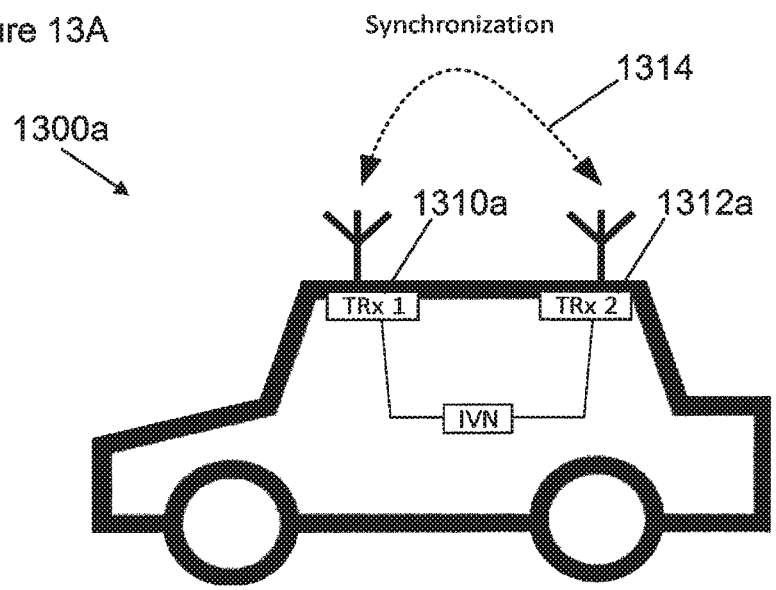
FIG. 13A shows an example embodiment of a multi-transceiver system on board a vehicle.
Figure 13B:
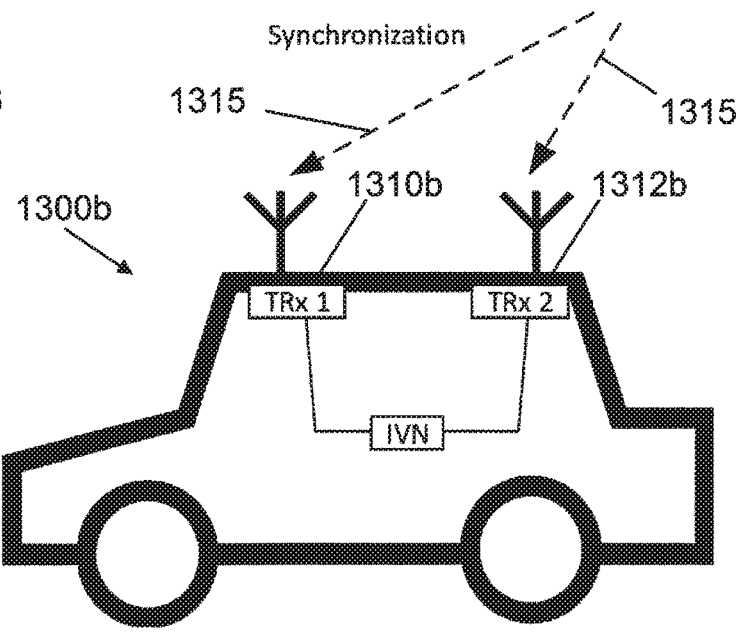
FIG. 13B shows another example embodiment of a multi-transceiver system on board a vehicle.
Figure 13C:
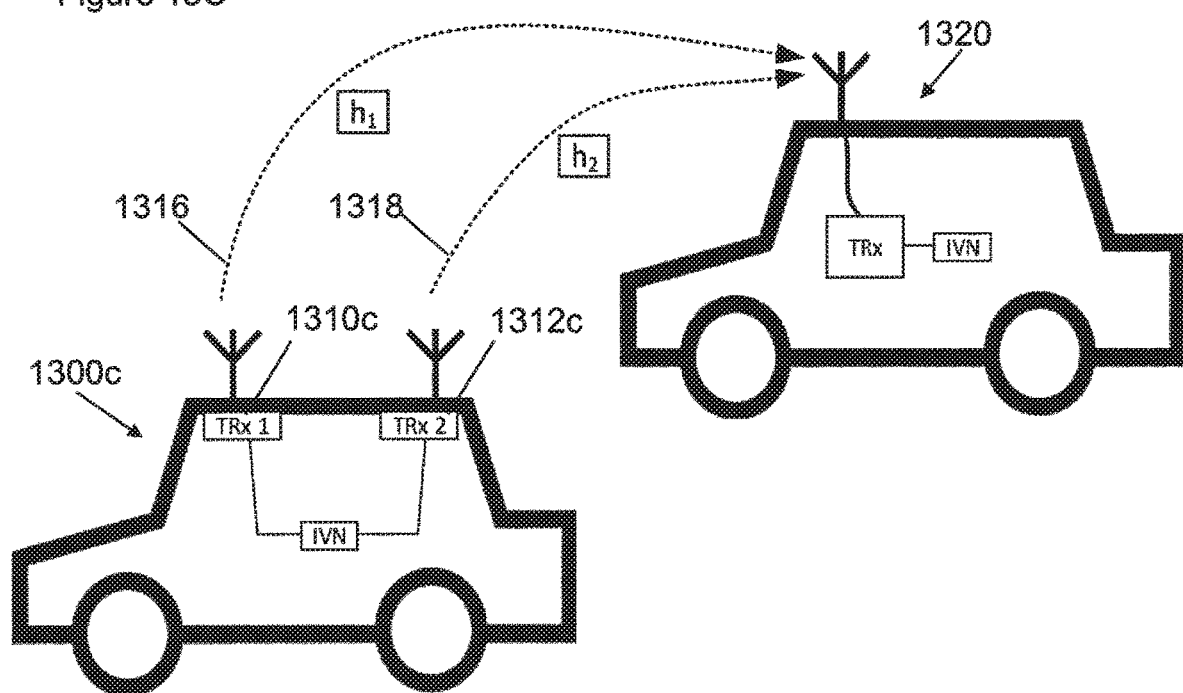
FIG. 13C shows an example embodiment of a multi-transceiver system on board a vehicle providing an aligned multi-antenna transmission to another vehicle.

FIGS. 13A to 13C show how embodiments of the present disclosure could be used in IEEE 802.11p based vehicle-to-vehicle and vehicle-to-infrastructure communication networks.

In FIG. 13A, a first vehicle 1300a has a two-antenna multi-transceiver system with a first transceiver 1310a and a second transceiver 1312a, that optionally may employ cyclic delay diversity (CDD). At a first time, the first transceiver 1310a can be aligned/synchronized with the second transceiver 1312a by using a wireless alignment signal 1314. Then, at a subsequent time, FIG. 13C shows that the first vehicle 1300b can transmit a first frame 1316 with the first transceiver 1310b and a second frame 1318 with the second transceiver 1312b. Both the first frame 1316 and the second frame 1318 can consist of corresponding representations of the same data signal, which can be received at a second vehicle 1320. Since the first transceiver 1310b is spaced apart from the second transceiver 1312b interference, such as fading, may advantageously be reduced for at least one of the signals is 1316, 1318 received at the second vehicle 1320.

FIG. 13B shows an alternative to what is shown in FIG. 13A, in that the first transceiver 1310b can be aligned synchronized with the second transceiver 1312b by using wireless received common-signals 1315.

Figure 14:
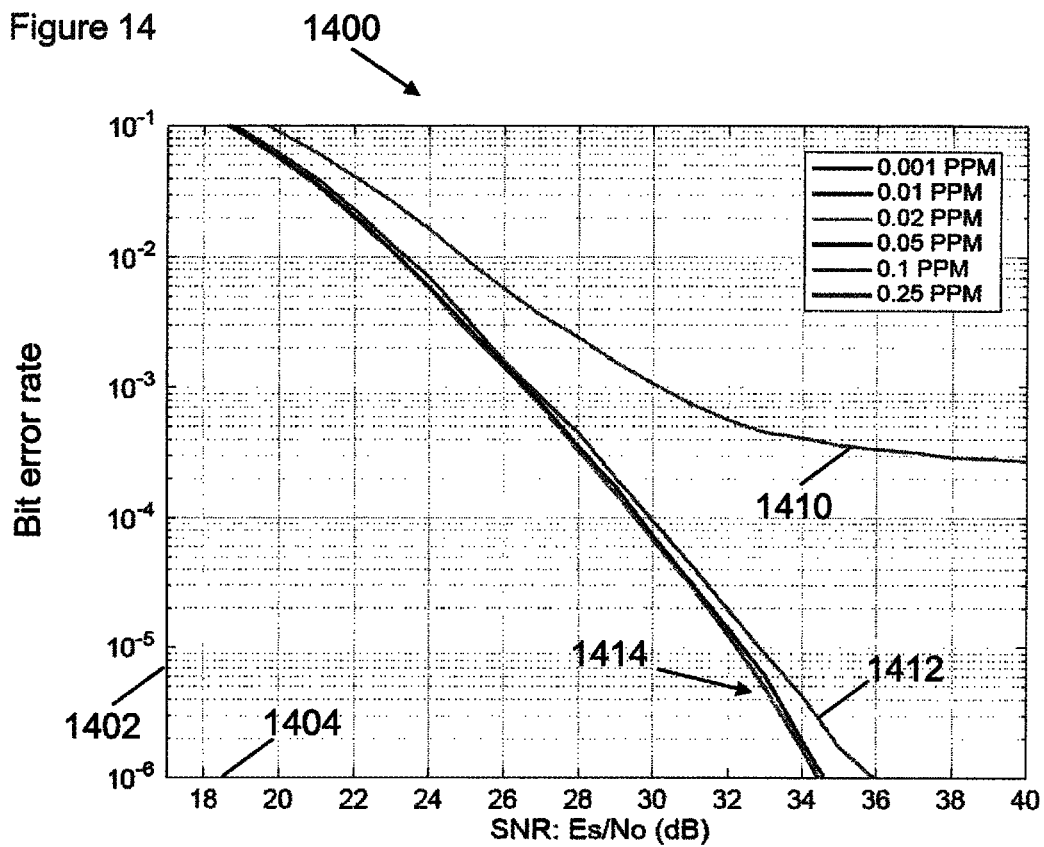
FIG. 14 shows an example chart of simulation data that shows how a bit error rate increases as a frequency offset increases between two transmitters.

FIG. 14 shows a chart 1400 of simulation results of performance for different carrier frequency offsets (CFO) in Parts Per Million (PPM) between two transmitters that are not well aligned, which causes a higher bit error rate at a receiver. The bit error rate is shown on a vertical axis 1402 and a signal to noise ratio is shown on a horizontal axis 1404. A first line 1410 shows how the bit error rate varies with signal to noise ratio for a CFO of 0.25 PPM. A second line 1412 shows how the bit error rate varies with signal to noise ratio for a CFO of 0.1 PPM. It is evident that the smaller misalignment of the second line 1412 provides for a significantly reduced bit error rate compared to the larger misalignment of the first line 1410. The chart 1400 also shows several other lines 1414 with CFO ranging from 0.001-0.05 PPM that show slightly better performance than the second line 1412.

This chart 1400 therefore shows the importance, for reducing errors, of maintaining good alignment between multiple transceivers in any multi-transceiver system.

Figure 15:
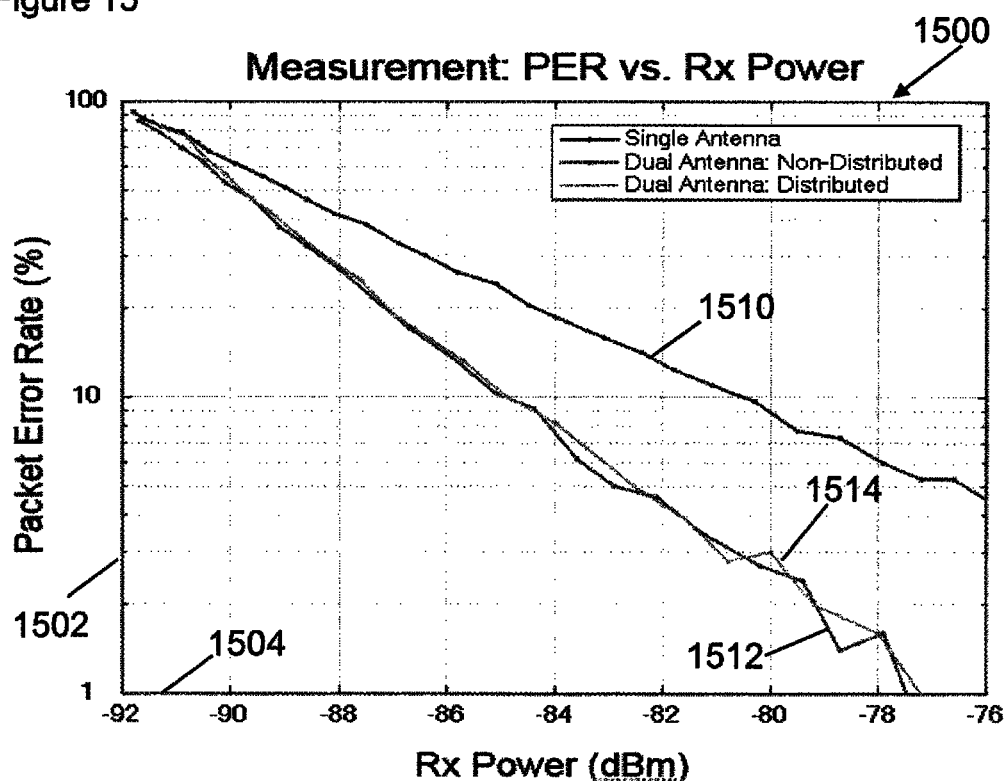
FIG. 15 shows an example embodiment of a chart of measured data of the bit error rate as a function of signal to noise ratio for a multi-transceiver system compared to other possible transceiver systems.

FIG. 15 shows a chart 1500 of the performance of a solution that has been implemented for an embodiment of the present disclosure. The chart 1500 shows packet error rate on a vertical axis 1502 and power received at a receiver on a horizontal axis 1504. The chart 1500 shows the packet error rate as a function of received power for a first line 1510 (which relates to a single antenna system) a second line 1512 (which relates to a two antenna system that is not distributed) and a third line 1514 (which relates to a two antenna system that is distributed and has alignment error reduction functionality in accordance with the present disclosure). The first line 1510 shows a relatively high error rate for signal transmitted across a broad range of received powers. The second line 1512 shows a significantly lower error rate than the first line 1510, as expected since the second line 1512 relates to a system with two antennae that use the same time/clock-generation-unit to provide timing to two transceivers, which can therefore be expected to have no significant alignment error. Significantly, the performance indicated by the third line 1514 appears to be very similar to that of the second line, despite the third line relating to a system with two separate time/clock-generation-units driving two separate distributed antennae. This chart 1500 therefore confirms that aligning two distributed time/clock-generation-units in accordance with the present disclosure can enable a distributed transmitter architecture to perform with negligible loss of performance compared to a system with a single time/clock-generation-unit that drives all transceivers.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/ method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A first-transceiver system for use in an antenna diversity scheme, the first-transceiver system comprising:
   a first-time/clock-generation-unit;
   a first-receiver, configured to receive a wireless first-common-signal from a third-party-transmitter, wherein the first-common-signal is representative of a common-signal transmitted by the third-party-transmitter;
   a first-transmitter; and
   a timing-controller, configured to:
      receive signalling representative of the first-common-signal;
      receive signalling representative of a wireless second-common-signal as received at a second-transceiver, the second-transceiver comprising a second-time/clock-generation-unit, the wireless second-common-signal being representative of the common-signal;
      generate a timing-signal based on the first-common-signal and the second-common-signal,
   wherein:
      the first-transceiver system is configured to set the first-time/clock-generation-unit, based on the timing-signal, to reduce an alignment-error between the first-time/clock-generation-unit and the second-time/clock-generation-unit;
the first-transmitter is configured to transmit a wireless first-transmission-signal, in accordance with the first-time/clock-generation-unit, as part of the antenna diversity scheme, wherein:
the first-transmission-signal corresponds to a second-transmission-signal that is transmitted by the second-transceiver; and
the antenna diversity scheme comprises aligned transmission of both the first-transmission-signal and the second-transmission-signal.

2. The first-transceiver system of claim 1, wherein the first transceiver system is configured to set the first-time/clock-generation-unit by adjusting a time of the first-time/clock-generation-unit and/or a frequency of the first-time/clock-generation-unit.

3. The first transceiver system of claim 2, wherein the first-time/clock-generation-unit comprises a frequency synthesizer and a system timer, and wherein the first-transceiver is configured to set the first-time/clock-generation-unit by one or more of:
applying an offset to a count of the system timer;
applying a frequency offset to one or more of:
a carrier frequency that is provided to tuners of the transmitter and/or the receiver,
a sampling frequency that is provided to a DAC of the transmitter and/or an ADC of the receiver,
a system timer frequency that is provided to the system timer;
tuning a crystal oscillator that is associated with the frequency synthesizer;
changing divider settings of a phase locked loop that is associated with the frequency synthesizer;
digitally rotating digital samples for compensating an RF carrier frequency offset; and
resampling of a digital signal for compensating a difference in DA converter frequency.

4. The first-transceiver system of claim 1, wherein the common-signal comprises a predetermined pattern of information, and the timing-controller is configured to generate the timing-signal based on a correlation technique.

5. The first-transceiver system of claim 1, wherein the timing-controller is configured to generate the timing-signal based on a comparison of first-IQ-samples representative of the first-common-signal and second-IQ-samples representative of the second-common-signal.

6. The first-transceiver system of claim 1, wherein the aligned transmission comprises transmission of both the first-transmission-signal and the second-transmission-signal aligned with respect to time and/or frequency such that they constructively combine when received at a remote receiver.

7. A multi-transceiver system comprising:
a first-transceiver comprising:
a first-time/clock-generation-unit;
a first-receiver, configured to receive a wireless first-common-signal from a third-party-transmitter, wherein the first-common-signal is representative of a common-signal transmitted by the third-party-transmitter;
a first-transmitter; and
a timing-controller, configured to:
receive signalling representative of the first-common-signal;
receive signalling representative of a wireless second-common-signal as received at a second-transceiver, the second-transceiver comprising a second-time/clock-generation-unit, the wireless second-common-signal being representative of the common-signal;
generate a timing-signal based on the first-common-signal and the second-common-signal,
wherein:
the first-transceiver system is configured to set the first-time/clock-generation-unit, based on the timing-signal, to reduce an alignment-error between the first-time/clock-generation-unit and the second-time/clock-generation-unit;
the first-transmitter is configured to transmit a wireless first-transmission-signal, in accordance with the first-time/clock-generation-unit, as part of the antenna diversity scheme, wherein:
the first-transmission-signal corresponds to a second-transmission-signal that is transmitted by the second-transceiver; and
the antenna diversity scheme comprises aligned transmission of both the first-transmission-signal and the second-transmission-signal,
the second transceiver, and
a digital communication channel configured to exchange coordination-signalling between the first-transceiver and the second-transceiver to co-ordinate setting the first-time/clock-generation-unit and/or the second time/clock-generation-unit.

8. The multi-transceiver system of claim 7, wherein the timing-controller is:
co-located with the first-transceiver; and
connected to the second-transceiver via the digital communication channel.

9. The multi-transceiver system of claim 7, further comprising a central control unit that is separate from the first-transceiver, wherein the central control unit:
is configured to provide the functionality of the timing-controller; and
is connected to the first-transceiver and the second-transceiver via the digital communication channel.

10. The multi-transceiver system of claim 7, wherein the timing-controller is configured to set the first-time/clock-generation-unit and the second-time/clock-generation-unit based on an average time and/or frequency derived from the first-common-signal and the second-common-signal.

11. The first-transceiver system of claim 1, wherein:
the first-receiver is configured to receive a wireless second-alignment-signal from the second-transceiver, wherein the wireless second-alignment-signal is representative of a state of the second-time/clock-generation-unit;
the first transceiver system is configured to set the first-time/clock-generation-unit, based on the wireless second-alignment-signal, to reduce an alignment-error between the first-time/clock-generation-unit and the second-time/clock-generation-unit.

12. The first transceiver system of claim 11, wherein the wireless second-alignment-signal comprises a prefix and/or a postfix portion of an earlier-second-transmission-signal, and wherein the earlier-second-transmission-signal is transmitted before the second-transmission-signal.

13. The first transceiver system of claim 11, further configured to:
receive a plurality of wireless alignment-signals, including the wireless second-alignment-signal, from a plurality of other transceivers, including the second-transceiver; and set the first-time/clock-generation-unit, based on the plurality of wireless alignment-signals, to reduce alignment-errors between the first-time/clock-generation-unit and a plurality of time/clock-generation-units of the other transceivers.

14. The first transceiver system of claim 11, wherein the coordination-signalling comprises one or more of:
a time-of-transmission of the second-alignment-signal;
a value of the second-time/clock-generation-unit at a predefined moment in time relative to the time-of-transmission of the second-alignment-signal;
a value of the second-time/clock-generation-unit at a time-of-transmission of the second-alignment-signal;
a delay between the time-of-transmission and the time-of-reception of the second-alignment-signal;
an expected time of arrival of the wireless second-alignment-signal at the first-transceiver; and/or
an expected time of arrival of the wireless first-alignment-signal at the second-transceiver.

15. A method of operating a first-transceiver system for use in an antenna diversity scheme, the first-transceiver system comprising a first-time/clock-generation-unit, the method comprising:
receiving at the first-transceiver system a wireless first-common-signal from a third-party-transmitter, wherein the first-common-signal is representative of a common-signal transmitted by the third-party-transmitter;
receiving signalling representative of a wireless second-common-signal as received at a second-transceiver, the second-transceiver comprising a second-time/clock-generation-unit, the wireless second-common-signal being representative of the common-signal;
generating a timing-signal based on the first-common-signal and the second-common-signal,
setting the first-time/clock-generation-unit, based on the timing-signal, to reduce an alignment-error between the first-time/clock-generation-unit and the second-time/clock-generation-unit;
transmitting a wireless first-transmission-signal, in accordance with the first-time/clock-generation-unit, as part of the antenna diversity scheme, wherein:
the first-transmission-signal corresponds to a second-transmission-signal that is transmitted by the second-transceiver; and
the antenna diversity scheme comprises aligned transmission of both the first-transmission-signal and the second-transmission-signal.

16. The method of claim 15, wherein setting the first-time/clock-generation-unit further comprises adjusting a time of the first-time/clock-generation-unit and/or a frequency of the first-time/clock-generation-unit.

17. The method of claim 16, wherein setting the first-time/clock-generation-unit further comprises applying an offset to a count of the system timer.

18. The method of claim 15, further comprising generating, by way of a timing-controller, the timing-signal based on a correlation technique.

19. The method of claim 18, further comprising generating, by way of the timing-controller, the timing-signal based on a comparison of first-IQ-samples representative of the first-common-signal and second-IQ-samples representative of the second-common-signal.

20. The method of claim 15, further comprising transmitting both the first-transmission-signal and the second-transmission-signal aligned with respect to time and/or frequency such that they constructively combine when received at a remote receiver.

* * * * *